US012425942B2

(12) United States Patent
Zong et al.

(10) Patent No.: US 12,425,942 B2
(45) Date of Patent: Sep. 23, 2025

(54) COMMUNICATION METHOD AND APPARATUS FOR SENDING A HANDOVER REQUEST

(71) Applicant: Huawei Technologies Co., Ltd., Shenzhen (CN)

(72) Inventors: Zaifeng Zong, Nanjing (CN); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 467 days.

(21) Appl. No.: 17/856,290

(22) Filed: Jul. 1, 2022

(65) Prior Publication Data

US 2022/0338088 A1    Oct. 20, 2022

Related U.S. Application Data

(63) Continuation of application No. PCT/CN2020/127611, filed on Nov. 9, 2020.

(30) Foreign Application Priority Data

Jan. 3, 2020   (CN) .......................... 202010006160.2

(51) Int. Cl.
*H04W 36/26* (2009.01)
*H04W 36/00* (2009.01)

(52) U.S. Cl.
CPC ....... *H04W 36/26* (2013.01); *H04W 36/0007* (2018.08); *H04W 36/0072* (2013.01)

(58) Field of Classification Search
CPC ............... H04W 4/06; H04W 36/0007; H04W 36/0072; H04W 36/00; H04W 36/0016;
(Continued)

(56) References Cited

U.S. PATENT DOCUMENTS

2010/0322196 A1    12/2010    Cherian et al.
2011/0292859 A1    12/2011    So et al.
(Continued)

FOREIGN PATENT DOCUMENTS

CN    109309904 A    2/2019
CN    109600664 A    4/2019
(Continued)

OTHER PUBLICATIONS

3GPP TR 23.716 V1.2.0, Nov. 2018, "3rd Generation Partnership Project; Technical Specification Group Services and System Aspects; Study on the Wireless and Wireline Convergence for the 5G system architecture (Release 16)," 184 pages.
(Continued)

*Primary Examiner* — Quoc Thai N Vu
(74) *Attorney, Agent, or Firm* — Conley Rose, P.C.

(57) ABSTRACT

A communication method implemented by an apparatus includes that a source access network element sends information of a unicast quality of service (QoS) flow of a protocol data unit (PDU) session corresponding to a multicast QoS flow of a multicast broadcast service (MBS) to a target access network element in a handover procedure. The target access network element forwards the information to a session management network element. The session management network element then indicates a user plane network element connected to the target access network element to send data of the MBS to a terminal device through the target access network element and by using a resource of the unicast QoS flow corresponding to the multicast QoS flow of the MBS.

20 Claims, 6 Drawing Sheets

(58) Field of Classification Search
CPC .... H04W 36/0044; H04W 36/026; H04W 36/26
See application file for complete search history.

(56) References Cited

U.S. PATENT DOCUMENTS

| | | | |
|---|---|---|---|
| 2019/0223250 A1 | 7/2019 | Dao et al. | |
| 2019/0274063 A1* | 9/2019 | Na | H04W 28/0257 |
| 2019/0380069 A1* | 12/2019 | Park | H04W 36/0072 |
| 2020/0162855 A1 | 5/2020 | Li et al. | |
| 2021/0022063 A1 | 1/2021 | Yang et al. | |
| 2021/0400521 A1* | 12/2021 | Fiorani | H04W 28/10 |
| 2022/0369170 A1* | 11/2022 | Roeland | H04W 36/0011 |

FOREIGN PATENT DOCUMENTS

| | | |
|---|---|---|
| EP | 3079400 A1 | 10/2016 |
| WO | 2019196608 A1 | 10/2019 |

OTHER PUBLICATIONS

3GPP TS 38.300 V15.7.0, Sep. 2019, "3rd Generation Partnership Project; Technical Specification Group Radio Access Network; NR; NR and NG-RAN Overall Description; Stage 2 (Release 15)," 99 pages.
3GPP TS 38.413 V15.5.0 (Sep. 2019), 3rd Generation Partnership Project; Technical Specification Group Radio Access Network; NG-RAN; NG Application Protocol (NGAP)(Release 15), 329 pages.
3GPP TS 38.423 V15.5.0, Sep. 2019, "3rd Generation Partnership Project; Technical Specification Group Radio Access Network; NG-RAN; Xn application protocol (XnAP) (Release 15)," 311 pages.
Huawei et al., "Clarification on QoS handling," 3GPP TSG-WG SA2 Meeting #135, S2-1908922, Split, Croatia, Oct. 14-18, 2019, 5 pages.
Huawei et al., "Architectural assumptions," SA WG2 Meeting #135, S2-1909000, Split, Croatia, Oct. 14-18, 2019, 3 pages.
Huawei et al., "Key Issue: MBS session management," SA WG2 Meeting #135, S2-1909102, Split, Croatia, Oct. 14-18, 2019, 1 page.
Huawei et al., "Key Issue: Service continuity," SA WG2 Meeting #135, S2-1909104, Split, Croatia, Oct. 14-18, 2019, 1 page.
Qualcomm Incorporrated, "Solution to KI#7: Mobility between 5G MBS supporting and 5G MBS non-supporting NG RAN nodes," SA WG2 Meeting #139E, S2-2004223, Electronic meeting, Jun. 1-12, 2020, 3 pages.
Huawei et al., "KI1: Update of Sol. 3: resolving open issue(s)," 3GPP TSG-WG SA2 Meeting #140E e-meeting, S2-2006299, Elbonia, Aug. 19-Sep. 1, 2020, 15 pages.
Nokia et al., "KI#1: Conclusion update for MBS Session activation/deactivation and UE join/leave," SA WG2 Meeting #143E, S2-2101017, Electronic meeting, Feb. 24-Mar. 9, 2020, 23 pages.
"TDoc_List_Meeting_SA2#135", https://www.3gpp.org/ftp/tsg_sa/WG2_Arch/TSGS2_135_Split/, 2019, 2658 pages.

* cited by examiner

COMMUNICATION METHOD AND APPARATUS FOR SENDING A HANDOVER REQUEST

CROSS-REFERENCE TO RELATED APPLICATIONS

This is a continuation of International Patent Application No. PCT/CN2020/127611 filed on Nov. 9, 2020, which claims priority to Chinese Patent Application No. 202010006160.2 filed on Jan. 3, 2020. The disclosures of the aforementioned applications are hereby incorporated by reference in their entireties.

TECHNICAL FIELD

This application relates to the communication field, and in particular, to a communication method and an apparatus.

BACKGROUND

Although a 4th generation (4G) communication system supports a multicast broadcast service (MBS) in a protocol, a dedicated resource needs to be reserved for the MBS, the MBS is not actually deployed, and a 5th generation (5G) communication system does not support the MBS yet. Therefore, the 5G XCast organization proposes a point to multipoint (PTM), also referred to as air interface multicast, solution to support the MBS in the 5G system. The solution includes that a base station maps a data packet of an MBS to a radio resource of a unicast quality of service (QoS) flow, and sends data of the MBS to a terminal by using the radio resource of the unicast QoS flow. In this way, the MBS can be implemented in the 5G communication system, and there is no need to reserve a dedicated resource for the MBS. This improves radio resource utilization.

However, the foregoing technical solution of implementing the MBS in the 5G communication system in a point to multipoint manner needs to be supported by the base station. In other words, when a base station does not support point to multipoint, the 5G communication system cannot provide an MBS for a terminal that accesses the base station. Further, when a terminal is handed over from a source base station that supports the point to multipoint to a target base station that does not support the point to multipoint, an MBS is terminated because the target base station does not support the point to multipoint.

SUMMARY

Embodiments of this application provide a communication method and an apparatus, to resolve a problem that an MBS is terminated because a target access network element does not support the MBS in a handover scenario, and improve reliability of the MBS.

To achieve the foregoing objectives, this application uses the following technical solutions.

According to a first aspect, a communication method is provided. The method includes that a source access network element sends a handover request to a target access network element. The handover request includes information of a unicast QoS flow of a protocol data unit (PDU) session, and the unicast QoS flow corresponds to a multicast QoS flow of an MBS. Then, the source access network element receives a handover response from the target access network element. The handover response includes configuration information of a radio resource corresponding to the unicast QoS flow. The source access network element then sends a handover command to a terminal device. The handover command includes the configuration information of the radio resource.

According to the communication method provided in the first aspect, in the scenario in which the terminal device is handed over from the source access network element to the target access network element, the source access network element may send the information of the unicast QoS flow of the PDU session corresponding to the multicast QoS flow of the MBS to the target access network element in the handover request, so that after the terminal device is handed over to the target access network element, data of the MBS is sent to the target access network element by using a resource of the unicast QoS flow of the PDU session. Then, the target access network element forwards the data of the MBS to the terminal device. This can resolve a problem that the MBS is terminated because the target access network element does not support the MBS after the terminal device is handed over from the source access network element to the target access network element, ensure continuity of the MBS when the terminal device moves across access network elements with different capabilities, and improve reliability of the MBS.

The terminal device may join an MBS session through the PDU session.

The target access network element does not support the MBS.

Optionally, the communication method provided in the first aspect may further include that the source access network element receives capability information of the target access network element. The capability information may include information used to indicate that the target access network element does not support the MBS. In this way, based on the capability information, the source access network element may determine a handover solution for handing over the terminal device from the source access network element to the target access network element, for example, determine whether to switch the multicast QoS flow to the unicast QoS flow of the PDU session, and determine content carried in the handover request. This can improve a handover success rate, ensure the continuity of the MBS when the terminal device moves across access network elements with different capabilities, and further improve the reliability of the MBS.

In an example, the communication method provided in the first aspect may further include that the source access network element receives a first data packet from a user plane network element. The first data packet includes an identifier of the multicast QoS flow and data of the MBS. Then, the source access network element sends a second data packet to the target access network element. The second data packet includes an identifier of the unicast QoS flow and the data of the MBS. In other words, the source access network element may convert a data packet of the MBS received from the user plane network element into a unicast data packet, and forward the unicast data packet to the terminal device. In this way, after being handed over from the source access network element to the target access network element that does not support the MBS, the terminal device can continue to receive the data of the MBS from the target access network element, so that the reliability of the MBS is further improved.

Optionally, the communication method provided in the first aspect may further include that the source access network element obtains, based on a mapping relationship, information of the unicast QoS flow corresponding to the multicast QoS flow. The mapping relationship includes a correspondence between the identifier of the multicast QoS flow and the identifier of the unicast QoS flow. Optionally, the communication method provided in the first aspect may further include that the source access network element receives the mapping relationship. Further, the source access network element may receive the mapping relationship from a session management network element.

Further, the mapping relationship may further include a correspondence between a multicast QoS parameter and a unicast QoS parameter. The multicast QoS parameter is a QoS parameter of the multicast QoS flow, and the unicast QoS parameter is a QoS parameter of the unicast QoS flow. In this way, a QoS requirement of the unicast QoS flow corresponding to a QoS requirement of the MBS can be accurately learned of, to accurately determine a data transmission solution of the unicast QoS flow, for example, to determine a modulation and coding scheme (MCS), a bit error rate, and a transmission delay, and to ensure the reliability and efficiency of the MBS.

Optionally, the communication method provided in the first aspect may further include that the source access network element determines, based on the mapping relationship and the identifier of the multicast QoS flow included in the first data packet, the identifier of the unicast data flow included in the second data packet.

Optionally, the communication method provided in the first aspect may further include that the source access network element determines, based on the mapping relationship and information of the multicast QoS flow of the MBS, the information of the unicast QoS flow of the PDU session corresponding to the multicast QoS flow of the MBS.

In this embodiment of this application, the mapping relationship may be used by the source access network element or the user plane network element to convert a received data packet of the MBS into a corresponding unicast data packet. Optionally, the mapping relationship may alternatively be sent to the terminal device, so that the terminal device learns of, based on a received unicast data packet, the information of the multicast QoS flow corresponding to the unicast QoS flow, and sends parsed data of the MBS to a corresponding application program.

According to a second aspect, a communication method is provided. The method includes that a session management network element receives an identifier of a unicast QoS flow of a PDU session from a target access network element. The unicast QoS flow of the PDU session corresponds to a multicast QoS flow of an MBS. Then, the session management network element sends a request message to a user plane network element. The request message is used to request the user plane network element to send data of the MBS to the target access network element by using the unicast QoS flow.

The request message includes an identifier of the multicast QoS flow and the identifier of the unicast QoS flow.

The terminal device may join an MBS session through the PDU session.

In an example, the communication method provided in the second aspect may further include that the session management network element obtains the identifier of the multicast QoS flow based on a mapping relationship and the identifier of the unicast QoS flow. The mapping relationship includes a correspondence between the identifier of the multicast QoS flow and the identifier of the unicast QoS flow. Then, the session management network element sends a session modification request message to the user plane network element based on the mapping relationship. The session modification request message carries the identifier of the multicast QoS flow and the identifier of the unicast QoS flow, so that after receiving the data of the MBS and the identifier of the multicast QoS flow corresponding to the data of the MBS, the user plane network element sends the data of the MBS and the identifier of the unicast QoS flow to the target access network element. Then, the target access network element may send the data of the MBS to the terminal device based on the identifier of the unicast QoS flow. In this way, after being handed over from a source access network element to the target access network element that does not support the MBS, the terminal device can continue to receive the data of the MBS. This ensures continuity of the MBS when the terminal device moves across access network elements with different capabilities, and improves reliability of the MBS.

Optionally, the mapping relationship may further include a correspondence between a multicast QoS parameter and a unicast QoS parameter. The multicast QoS parameter is a QoS parameter of the multicast QoS flow, and the unicast QoS parameter is a QoS parameter of the unicast QoS flow.

In an example, the communication method provided in the second aspect may further include that the session management network element sends the mapping relationship to the source access network element, so that the source access network element determines, based on the mapping relationship, information of the unicast QoS flow of the PDU session corresponding to the multicast QoS flow, and sends the information to the target access network element. In this way, when being handed over to the target access network element, the terminal device can receive the data of the MBS through the PDU session. The session management network element sends the mapping relationship to the source access network element, so that the source access network element can convert a data packet of the MBS received from the user plane network element into a unicast data packet, and forward the unicast data packet to the terminal device, to avoid a packet loss in a handover process.

In addition, for a technical effect of the communication method in the second aspect, refer to the technical effect of the communication method in the first aspect. Details are not described herein again.

According to a third aspect, a communication method is provided. The method includes that a user plane network element receives a request message from a session management network element. The request message is used to request the user plane network element to send data of an MBS to a target access network element by using a unicast QoS flow of a PDU session. Then, the user plane network element sends the data of the MBS to the target access network element by using the unicast QoS flow.

The terminal device may join an MBS session through the PDU session.

In an example, that the user plane network element sends the data of the MBS to the target access network element by using the unicast QoS flow may include that the user plane network element sends a third data packet to the target access network element by using the unicast QoS flow. The third data packet includes the data of the MBS and an identifier of the unicast QoS flow. In this way, after being handed over from a source access network element to the target access network element that does not support the MBS, the terminal device can continue to receive a data packet of the MBS through the PDU session. This ensures continuity of the MBS when the terminal device moves across access network elements with different capabilities, and improves reliability of the MBS.

In another example, the user plane network element may alternatively send a first data packet to the source access network element by using a multicast QoS flow of the MBS. The first data packet includes the data of the MBS and an identifier of the multicast QoS flow. Then, the source access network element may directly send the first data packet to the terminal device, or may convert the first data packet into a unicast data packet including the data of the MBS and the identifier of the unicast QoS flow corresponding to the identifier of the multicast QoS flow, and send the unicast data packet to the target access network element. Then, the target access network element sends the unicast data packet to the terminal device. In this way, the terminal device can receive the data of the MBS before and after handover, to improve the reliability of the MBS.

Optionally, the communication method provided in the third aspect may further include that the user plane network element receives the data packet of the MBS, where the data packet of the MBS includes the data of the MBS and the identifier of the multicast QoS flow. The user plane network element determines the identifier of the unicast QoS flow in the third data packet based on the identifier of the multicast QoS flow.

In addition, for a technical effect of the communication method in the third aspect, refer to the technical effect of the communication method in the first aspect. Details are not described herein again.

According to a fourth aspect, a communication method is provided. The method includes that a first network element receives data of an MBS. Then, the first network element sends the data of the MBS to a terminal device by using a unicast QoS flow of a PDU session of the terminal device. The terminal device may join an MBS session through the PDU session.

According to the communication method provided in the fourth aspect, after the terminal device joins the MBS session through the PDU session, the first network element may send the data of the MBS to the terminal device by using the unicast QoS flow of the PDU session. The data of the MBS is sent to the terminal device by using a radio resource of the unicast QoS flow, so as to provide the MBS for the terminal device when a quantity of terminal devices receiving the MBS is small or a radio signal of the terminal device is poor. This avoids allocating a multicast radio resource to the MBS, to improve resource utilization and communication efficiency.

In an example, the first network element may be an access network element. The data of the MBS is carried in a first data packet. The first data packet includes an identifier of a multicast QoS flow. Correspondingly, the communication method provided in the fourth aspect may further include that the access network element determines the unicast QoS flow based on a mapping relationship. The mapping relationship includes a correspondence between the identifier of the multicast QoS flow and an identifier of the unicast QoS flow.

Optionally, the communication method provided in the fourth aspect may further include that the access network element determines to send the data of the MBS to the terminal device in a unicast manner. In other words, in this embodiment of this application, the access network element may determine a manner of sending the data of the MBS to the terminal device. If the unicast manner is used, the access network element determines the identifier of the unicast QoS flow based on the identifier of the multicast QoS flow in the first data packet, and sends the data of the MBS to the terminal device by using the radio resource corresponding to the identifier of the unicast QoS flow.

Further, the communication method provided in the fourth aspect may further include that the access network element configures the radio resource corresponding to the unicast QoS flow for the terminal device.

Further, the communication method provided in the fourth aspect may further include that the access network element determines to send the data of the MBS in the unicast manner based on one or more of the following. A signal strength of a signal received by the terminal device from the access network element is less than or equal to a strength threshold, and a quantity of terminal devices that receive the MBS through the access network element is less than or equal to a quantity threshold. In this way, the manner of sending the data of the MBS may be determined based on signal strength of the terminal device and the quantity of terminal devices that receive the MBS, to further improve radio resource utilization for sending the data of the MBS.

Further, the communication method provided in the fourth aspect may further include that the access network element receives the mapping relationship from a session management network element.

Optionally, the mapping relationship may further include a correspondence between a multicast QoS parameter and a unicast QoS parameter.

Further, the access network element configures the radio resource corresponding to the unicast QoS flow for the terminal device based on the unicast QoS parameter.

In another example, the first network element may be a user plane network element. The data of the MBS is carried in a first data packet. The first data packet includes an identifier of a multicast QoS flow. Correspondingly, the communication method provided in the fourth aspect may further include that the user plane network element determines the unicast QoS flow based on a mapping relationship. The mapping relationship includes a correspondence between the identifier of the multicast QoS flow and an identifier of the unicast QoS flow. In other words, in this embodiment of this application, alternatively, the user plane network element may convert a data packet of the MBS into a unicast data packet, and send the data of the MBS to the terminal device in a unicast manner.

Optionally, the communication method provided in the fourth aspect may further include that the user plane network element receives the mapping relationship from a session management network element.

Optionally, the mapping relationship may further include a correspondence between a multicast QoS parameter and a unicast QoS parameter. The multicast QoS parameter is a QoS parameter of the multicast QoS flow, and the unicast QoS parameter is a QoS parameter of the unicast QoS flow. In this way, a QoS requirement of the unicast QoS flow corresponding to a QoS requirement of the MBS can be accurately learned of, to accurately determine a data transmission solution of the unicast QoS flow, for example, determine an MCS, a bit error rate, and a transmission delay, and to ensure reliability and efficiency of the MBS.

According to a fifth aspect, a communication method is provided. The method includes that a session management network element generates a mapping relationship. The mapping relationship is used by a first network element to send data of an MBS to a terminal device by using a unicast QoS flow of a PDU session of the terminal device. The terminal device may join an MBS session through the PDU session. Then, the session management network element sends the mapping relationship to the first network element.

In an example, the mapping relationship includes a correspondence between an identifier of a multicast QoS flow and an identifier of the unicast QoS flow.

Optionally, the mapping relationship may further include a correspondence between a multicast QoS parameter and a unicast QoS parameter. The multicast QoS parameter is a QoS parameter of the multicast QoS flow, and the unicast QoS parameter is a QoS parameter of the unicast QoS flow.

For example, the first network element may be an access network element or a user plane network element, that is, the access network element or the user plane network element may complete a forwarding operation on the data of the MBS.

In addition, for a technical effect of the communication method in the fifth aspect, refer to the technical effect of the communication method in the fourth aspect. Details are not described herein again.

According to a sixth aspect, a communication apparatus is provided. The apparatus includes a sending module and a receiving module. The sending module is configured to send a handover request to a target access network element. The handover request includes information of a unicast QoS flow of a PDU session. The unicast QoS flow corresponds to a multicast QoS flow of an MBS. The receiving module is configured to receive a handover response from the target access network element. The handover response includes configuration information of a radio resource corresponding to the unicast QoS flow. The sending module is further configured to send a handover command to a terminal device. The handover command includes the configuration information of the radio resource.

The target access network element does not support the MBS.

Optionally, the receiving module is further configured to receive capability information of the target access network element. The capability information may include information used to indicate that the target access network element does not support the MBS.

In a possible design, the receiving module is further configured to receive a first data packet from a user plane network element. The first data packet includes an identifier of the multicast QoS flow and data of the MBS. The sending module is further configured to send a second data packet to the target access network element. The second data packet includes an identifier of the unicast QoS flow and the data of the MBS.

Optionally, the communication apparatus provided in the sixth aspect may further include a processing module. The processing module is configured to obtain, based on a mapping relationship, the information of the unicast QoS flow corresponding to the multicast QoS flow. The mapping relationship includes a correspondence between the identifier of the multicast QoS flow and the identifier of the unicast QoS flow.

Optionally, the receiving module is further configured to receive the mapping relationship. Further, the receiving module is further configured to receive the mapping relationship from a session management network element.

Further, the mapping relationship may further include a correspondence between a multicast QoS parameter and a unicast QoS parameter. The multicast QoS parameter is a QoS parameter of the multicast QoS flow, and the unicast QoS parameter is a QoS parameter of the unicast QoS flow.

Optionally, the communication apparatus in the sixth aspect may further include a storage module. The storage module stores a program or instructions. When the processing module executes the program or the instructions, the communication apparatus in the sixth aspect can perform the communication method in the first aspect.

It should be noted that the communication apparatus in the sixth aspect may be a source access network element, or may be a chip or a chip system disposed in the source access network element. This is not limited in this application.

In addition, for a technical effect of the communication apparatus in the sixth aspect, refer to the technical effect of the communication method in the first aspect. Details are not described herein again.

According to a seventh aspect, a communication apparatus is provided. The apparatus includes a sending module and a receiving module. The receiving module is configured to receive an identifier of a unicast QoS flow of a PDU session from a target access network element. The unicast QoS flow of the PDU session corresponds to a multicast QoS flow of an MBS. The sending module is configured to send a request message to a user plane network element. The request message is used to request the user plane network element to send data of the MBS to the target access network element by using the unicast QoS flow.

The request message includes an identifier of the multicast QoS flow and the identifier of the unicast QoS flow.

In a possible design, the communication apparatus provided in the seventh aspect may further include a processing module. The processing module is configured to obtain the identifier of the multicast QoS flow based on a mapping relationship and the identifier of the unicast QoS flow. The mapping relationship includes a correspondence between the identifier of the multicast QoS flow and the identifier of the unicast QoS flow.

Optionally, the mapping relationship may further include a correspondence between a multicast QoS parameter and a unicast QoS parameter. The multicast QoS parameter is a QoS parameter of the multicast QoS flow, and the unicast QoS parameter is a QoS parameter of the unicast QoS flow.

In an example, the sending module is further configured to send the mapping relationship to a source access network element.

Optionally, the communication apparatus in the seventh aspect may further include a storage module. The storage module stores a program or instructions. When the processing module executes the program or the instructions, the communication apparatus in the seventh aspect can perform the communication method in the second aspect.

It should be noted that the communication apparatus in the seventh aspect may be a session management network element, or may be a chip or a chip system disposed in the session management network element. This is not limited in this application.

In addition, for a technical effect of the communication apparatus in the seventh aspect, refer to the technical effect of the communication method in the first aspect. Details are not described herein again.

According to an eighth aspect, a communication apparatus is provided. The apparatus includes a sending module and a receiving module. The receiving module is configured to receive a request message from a session management network element. The request message is used to request a user plane network element to send data of an MBS to a target access network element by using a unicast QoS flow of a PDU session. The sending module is configured to send the data of the MBS to the target access network element by using the unicast QoS flow.

In a possible design, the sending module is further configured to send a third data packet to the target access network element by using the unicast QoS flow. The third data packet includes the data of the MBS and an identifier of the unicast QoS flow.

In another possible design, the sending module is further configured to send a first data packet to a source access network element by using a multicast QoS flow of the MBS. The first data packet includes the data of the MBS and an identifier of the multicast QoS flow.

Optionally, the communication apparatus in the eighth aspect may further include a storage module. The storage module stores a program or instructions. When a processing module executes the program or the instructions, the communication apparatus in the eighth aspect can perform the communication method in the third aspect.

It should be noted that the communication apparatus in the eighth aspect may be a user plane network element, or may be a chip or a chip system disposed in the user plane network element. This is not limited in this application.

In addition, for a technical effect of the communication apparatus in the eighth aspect, refer to the technical effect of the communication method in the first aspect. Details are not described herein again.

According to a ninth aspect, a communication apparatus is provided. The apparatus includes a processing module and a transceiver module. The transceiver module is configured to receive data of an MBS. The processing module is configured to control the transceiver module to send the data of the MBS to a terminal device by using a unicast QoS flow of a PDU session of the terminal device. The terminal device may join an MBS session through the PDU session.

In a possible design, the communication apparatus provided in the ninth aspect may be an access network element. The data of the MBS is carried in a first data packet. The first data packet includes an identifier of a multicast QoS flow. Correspondingly, the processing module is further configured to determine the unicast QoS flow based on a mapping relationship. The mapping relationship includes a correspondence between the identifier of the multicast QoS flow and an identifier of the unicast QoS flow.

Optionally, the processing module is further configured to determine, based on an air interface status of the terminal device, to send the data of the MBS in a unicast manner.

Further, the processing module is further configured to determine to send the data of the MBS in the unicast manner based on one or more of the following. A signal strength of a signal received by the terminal device from the access network element is less than or equal to a strength threshold, and a quantity of terminal devices that receive the MBS through the access network element is less than or equal to a quantity threshold.

In another possible design, the communication apparatus provided in the ninth aspect may be a user plane network element. The data of the MBS is carried in a first data packet. The first data packet includes an identifier of a multicast QoS flow. Correspondingly, the processing module is further configured to determine the unicast QoS flow based on a mapping relationship. The mapping relationship includes a correspondence between the identifier of the multicast QoS flow and an identifier of the unicast QoS flow.

Optionally, the transceiver module is further configured to receive the mapping relationship from a session management network element.

Optionally, the mapping relationship may further include a correspondence between a multicast QoS parameter and a unicast QoS parameter. The multicast QoS parameter is a QoS parameter of the multicast QoS flow, and the unicast QoS parameter is a QoS parameter of the unicast QoS flow.

Optionally, the communication apparatus in the ninth aspect may further include a storage module. The storage module stores a program or instructions. When the processing module executes the program or the instructions, the communication apparatus in the ninth aspect can perform the communication method in the fourth aspect.

It should be noted that the communication apparatus in the ninth aspect may be an access network element or a user plane network element, or may be a chip or a chip system disposed in the access network element or the user plane network element. This is not limited in this application.

In addition, for a technical effect of the communication apparatus in the ninth aspect, refer to the technical effect of the communication method in the fourth aspect. Details are not described herein again.

According to a tenth aspect, a communication apparatus is provided. The apparatus includes a processing module and a transceiver module. The processing module is configured to generate a mapping relationship. The mapping relationship is used by a first network element to send data of an MBS to a terminal device by using a unicast QoS flow of a PDU session of the terminal device. The terminal device may join an MBS session through the PDU session. The transceiver module is configured to send the mapping relationship to the first network element.

In a possible design, the mapping relationship includes a correspondence between an identifier of a multicast QoS flow and an identifier of the unicast QoS flow.

Optionally, the mapping relationship may further include a correspondence between a multicast QoS parameter and a unicast QoS parameter. The multicast QoS parameter is a QoS parameter of the multicast QoS flow, and the unicast QoS parameter is a QoS parameter of the unicast QoS flow.

For example, the first network element may be an access network element or a user plane network element, that is, the access network element or the user plane network element may complete a forwarding operation on the data of the MBS.

Optionally, the communication apparatus in the tenth aspect may further include a storage module. The storage module stores a program or instructions. When the processing module executes the program or the instructions, the communication apparatus in the tenth aspect can perform the communication method in the fifth aspect.

It should be noted that the communication apparatus in the tenth aspect may be a session management network element, or may be a chip or a chip system disposed in the session management network element. This is not limited in this application.

In addition, for a technical effect of the communication apparatus in the tenth aspect, refer to the technical effect of the communication method in the fourth aspect. Details are not described herein again.

According to an eleventh aspect, a communication apparatus is provided. The communication apparatus includes a processor. The processor is coupled to a memory. The memory is configured to store a computer program. The processor is configured to execute the computer program stored in the memory, so that the communication apparatus performs the communication method according to any one of the possible implementations of the first aspect to the fifth aspect.

In a possible design, the communication apparatus in the eleventh aspect may further include a transceiver. The transceiver may be a transceiver circuit or an input/output port. The transceiver may be used by the communication apparatus to communicate with another communication apparatus.

In this application, the communication apparatus in the eleventh aspect may be a source access network element, a session management network element, a user plane network element, or a first network element, or may be a chip or a chip system disposed in the source access network element, the session management network element, the user plane network element, or the first network element.

For a technical effect of the communication apparatus in the eleventh aspect, refer to the technical effect of the communication method according to any one of the implementations of the first aspect to the fifth aspect. Details are not described herein again.

According to a twelfth aspect, a chip system is provided. The chip system includes a processor and an input/output port. The processor is configured to implement a processing function in the first aspect to the fifth aspect, and the input/output port is configured to implement a transceiver function in the first aspect to the fifth aspect.

In a possible design, the chip system further includes a memory. The memory is configured to store program instructions and data that implement a function in the first aspect to the fifth aspect.

The chip system may include a chip, or may include a chip and another discrete device.

According to a thirteenth aspect, a communication system is provided. The communication system includes the foregoing terminal device, one or more access network elements such as a source access network element and a target access network element, and one or more core network elements such as a user plane network element and a session management network element. The source access network element, the user plane network element, and the session management network element are network elements that support an MBS, and the source access network element and the user plane network element may also be collectively referred to as a first network element.

According to a fourteenth aspect, a computer-readable storage medium is provided. The computer-readable storage medium includes a program or instructions. When the program or the instructions are run on a computer, the computer is enabled to perform the communication method according to any one of the possible implementations of the first aspect to the fifth aspect.

According to a fifteenth aspect, a computer program product including instructions is provided. The computer program product includes a program or instructions. When the program or the instructions are run on a computer, the computer is enabled to perform the communication method according to any one of the possible implementations of the first aspect to the fifth aspect.

DESCRIPTION OF EMBODIMENTS

The following describes technical solutions in this application with reference to accompanying drawings.

The technical solutions in embodiments of this application may be applied to various communication systems, for example, a vehicle-to-everything (V2X) communication system, a device-to-device (D2D) communication system, an internet of vehicles communication system, a 4G mobile communication system such as a Long-Term Evolution (LTE) system, a Worldwide Interoperability for Microwave Access (WiMAX) system, a 5G mobile communication system such as a new radio (NR) system, and a future communication system such as a 6th generation (6G) mobile communication system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may also be used.

In addition, in embodiments of this application, words such as "example" and "for example" are used to represent giving an example, an illustration, or a description. Any embodiment or design scheme described as the "example" in this application should not be explained as being more preferred or having more advantages than another embodiment or design scheme. Exactly, the "example" is used to present a concept in a certain manner.

In embodiments of this application, the terms "information", "signal", "message", "channel", and "signaling" may sometimes be interchangeably used. It should be noted that, meanings expressed by the terms are consistent when differences between the terms are not emphasized. "Of", "corresponding (relevant)", and "corresponding" may sometimes be interchangeably used. It should be noted that meanings expressed by the terms are consistent when differences between the terms are not emphasized.

In embodiments of this application, sometimes a subscript such as $W_1$ may be written in an incorrect form such as W1. Expressed meanings are consistent when differences between them are not emphasized.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that with the evolution of the network architecture and emergence of a new service scenario, the technical solutions provided in embodiments of this application are also applicable to similar technical problems.

Figure 1:
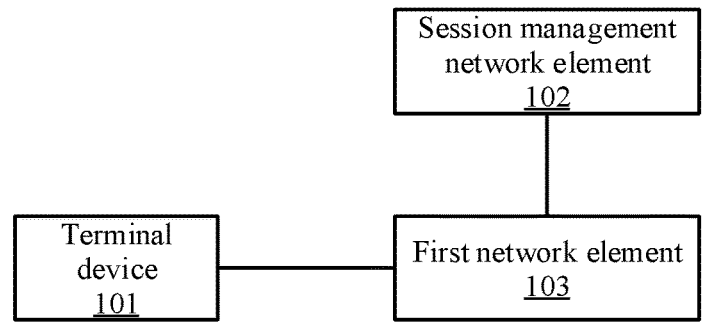
FIG. 1 is a schematic diagram 1 of an architecture of a communication system according to an embodiment of this application.

FIG. 1 is a schematic diagram 1 of an architecture of a communication system to which a communication method according to an embodiment of this application is applicable. For ease of understanding embodiments of this application, a communication system shown in FIG. 1 is first used as an example to describe in detail a communication system applicable to embodiments of this application. It should be noted that the solutions in embodiments of this application may also be applied to another mobile communication system, and a corresponding name may also be replaced with a name of a corresponding function in the other mobile communication system.

As shown in FIG. 1, the communication system includes a terminal device 101, a session management network element 102, and a first network element 103.

The session management network element 102 is configured to generate a mapping relationship. The mapping relationship is used by the first network element 103 to send data of an MBS to the terminal device 101 by using a unicast QoS flow of a PDU session of the terminal device 101. The terminal device 101 may join an MBS session through the PDU session. Then, the session management network element 102 sends the mapping relationship to the first network element 103.

The first network element 103 is configured to receive the data of the MBS. The first network element 103 is further configured to send the data of the MBS to the terminal device 101 by using the unicast QoS flow of the PDU session of the terminal device 101. The terminal device 101 joins the MBS session through the PDU session. For example, the first network element 103 may receive the mapping relationship from the session management network element 102, and send the data of the MBS received by the first network element 103 to the terminal device 101 by using the unicast QoS flow based on the mapping relationship.

The terminal device 101 is configured to receive the data that is of the MBS and that is sent by the first network element 103 by using the unicast QoS flow.

In other words, in the communication system shown in FIG. 1, a transmission direction of the data of the MBS may be from the first network element 103 to the terminal device 101.

It should be noted that the first network element 103 may be an access network element that supports the MBS or a user plane network element that supports the MBS. The following uses a handover scenario as an example for further description.

Figure 2:
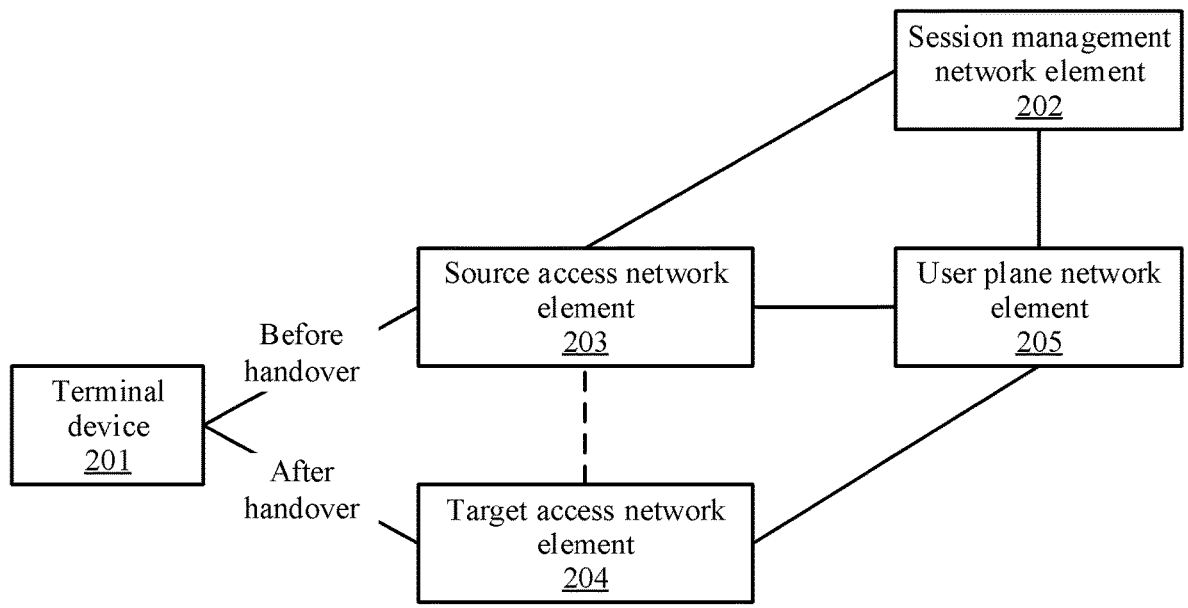
FIG. 2 is a schematic diagram 2 of an architecture of a communication system according to an embodiment of this application.

FIG. 2 is a schematic diagram 2 of an architecture of a communication system to which a communication method according to an embodiment of this application is applicable, such as, an example of the communication system shown in FIG. 1 in the handover scenario. As shown in FIG. 2, the communication system includes a terminal device 201, a session management network element 202, a source access network element 203, a target access network element 204, and a user plane network element 205. The source access network element 203 and the user plane network element 205 are network elements that support an MBS. The target access network element 204 is an access network element that does not support the MBS. The source access network element 203 or the user plane network element 205 is configured to perform a function of the first network element 103 shown in FIG. 1. In other words, the source access network element 203 may provide an MBS data forwarding service for the terminal device 201, or the user plane network element 205 may provide an MBS data forwarding service for the terminal device 201.

For example, the user plane network element 205 provides an MBS for the terminal device 201. The source access network element 203 is configured to send a handover request to the target access network element 204. The handover request includes information of a unicast QoS flow of a PDU session corresponding to a multicast QoS flow of the MBS. The source access network element 203 is further configured to receive a handover response from the target access network element 204. The handover response includes configuration information of a radio resource corresponding to the unicast QoS flow. The source access network element 203 is further configured to send a handover command to the terminal device 201. The handover command includes the configuration information of the radio resource.

The session management network element 202 is configured to receive an identifier of the unicast QoS flow of the PDU session from the target access network element 204. The unicast QoS flow of the PDU session corresponds to the multicast QoS flow of the MBS. The session management network element 202 is further configured to send a request message to the user plane network element 205. The request message is used to request the user plane network element 205 to send data of the MBS to the target access network element 204 by using the unicast QoS flow.

The user plane network element 205 is configured to receive the request message from the session management network element 202. The request message is used to request the user plane network element 205 to send the data of the MBS to the target access network element 204 by using the unicast QoS flow of the PDU session. The user plane network element 205 is further configured to send the data of the MBS to the target access network element 204 by using the unicast QoS flow.

It should be noted that, for the communication system shown in FIG. 2, the source access network element 203 may alternatively perform a function of the first network element shown 103 in FIG. 1 (shown by a dashed line in FIG. 2). For example, the source access network element 203 sends the data of the MBS received from the user plane network element 205 to the target access network element 204 by using the unicast QoS flow of the PDU session. For implementation, refer to the operation of the user plane network element 205 in the handover scenario shown in FIG. 2. Details are not described herein again.

In other words, before the handover succeeds, the data of the MBS may be sent through the forwarding path from the user plane network element 205 to the source access network element 203 to the terminal device 201. After the handover succeeds, the data of the MBS may be sent through the forwarding path from the user plane network element 205 to the target access network element 204 to the terminal device 201, or may be sent through the forwarding path from the user plane network element 205 to the source access network element 203 to the target access network element 204 to the terminal device 201.

Further, the communication system shown in FIG. 1 or FIG. 2 may be used in combination with a 5G communication system. The following uses a 5G communication system in a non-roaming scenario as an example for specific description.

Figure 3:
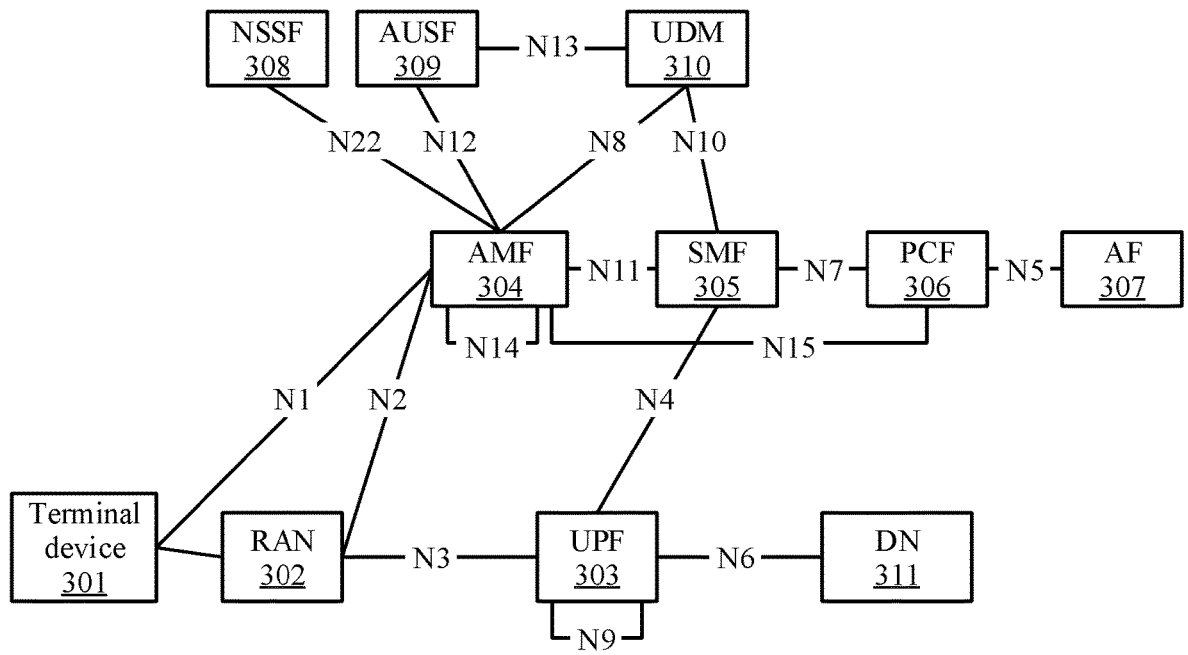
FIG. 3 is a schematic diagram of an architecture of a 5G communication system in a non-roaming scenario.

For example, FIG. 3 is a schematic diagram of an architecture of the 5G communication system in the non-roaming scenario. As shown in FIG. 3, the communication system includes a terminal device 301, a radio access network ((RAN) element 302, a user plane function (UPF) network element 303, an access and mobility management function (AMF) network element 304, a session management function (SMF) network element 305, a policy control function (PCF) network element 306, an application function (AF) network element 307, a network slice selection function (NSSF) network element 308, an authentication server function (AUSF) network element 309, a unified data management (UDM) network element 310, a data network (DN) 311, and the like. For a function and an example implementation of each network element, refer to a conventional technology. Details are not described in this embodiment of this application.

The terminal device 301 communicates with the AMF network element 304 through a next generation 1 interface (N1). The RAN 302 communicates with the AMF network element 304 through an N2 interface (N2), and the RAN 302 communicates with the UPF network element 303 through an N3 interface (N3). The UPF network element 303 communicates with the DN 311 through an N6 interface (N6). The AMF network element 304 communicates with the SMF network element 305 through an N11 interface (N11), the AMF network element 304 communicates with the PCF network element 306 through an N15 interface (N15), the AMF network element 304 communicates with the NSSF network element 308 through an N22 interface (N22), the AMF network element 304 communicates with the AUSF network element 309 through an N12 interface (N12), and the AMF network element 304 communicates with the UDM network element 310 through an N8 interface (N8). The SMF network element 305 communicates with the PCF network element 306 through an N7 interface (N7), the SMF network element 305 communicates with the UPF network element 303 through an N4 interface (N4), and the SMF network element 305 communicates with the UDM network element 310 through an N10 interface (N10). The PCF network element 306 communicates with the AF network element 307 through an N5 interface. The UDM network element 310 communicates with the AUSF network element 309 through an N13 interface (N13).

The terminal device 101 or 201 shown in FIG. 1 or FIG. 2, respectively, may be the terminal device 301 shown in FIG. 3, the session management network element 102 or 202 shown in FIG. 1 or FIG. 2, respectively, may be the SMF network element 305 shown in FIG. 3, the first network element 103 in FIG. 1 may be the RAN network element 302 or the UPF network element 303 shown in FIG. 3, and both the source access network element 203 and the target access network element 204 shown in FIG. 2 may be the RAN network element 302 shown in FIG. 3.

Figure 4:
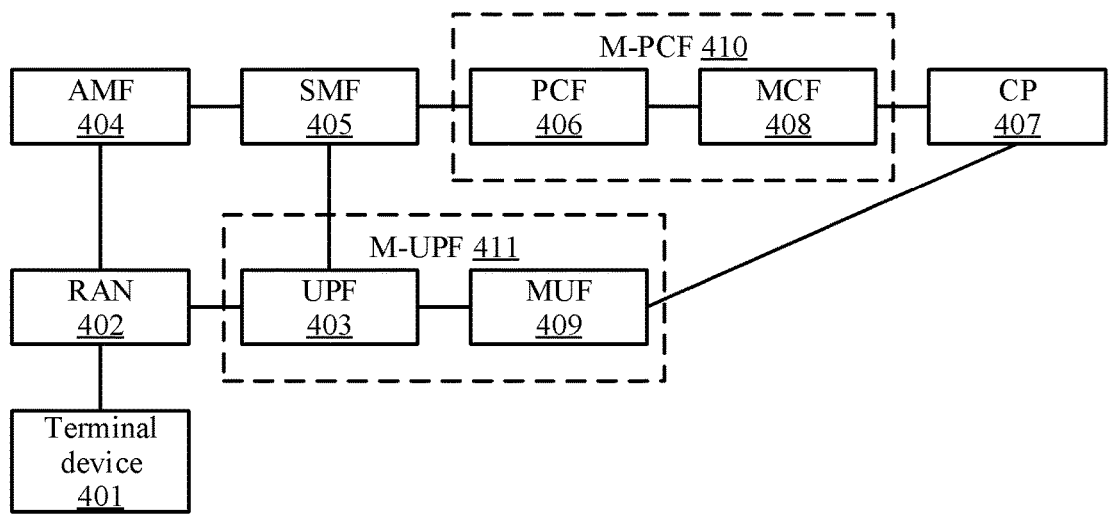
FIG. 4 is a schematic diagram 3 of an architecture of a communication system according to an embodiment of this application.
Figure 5:
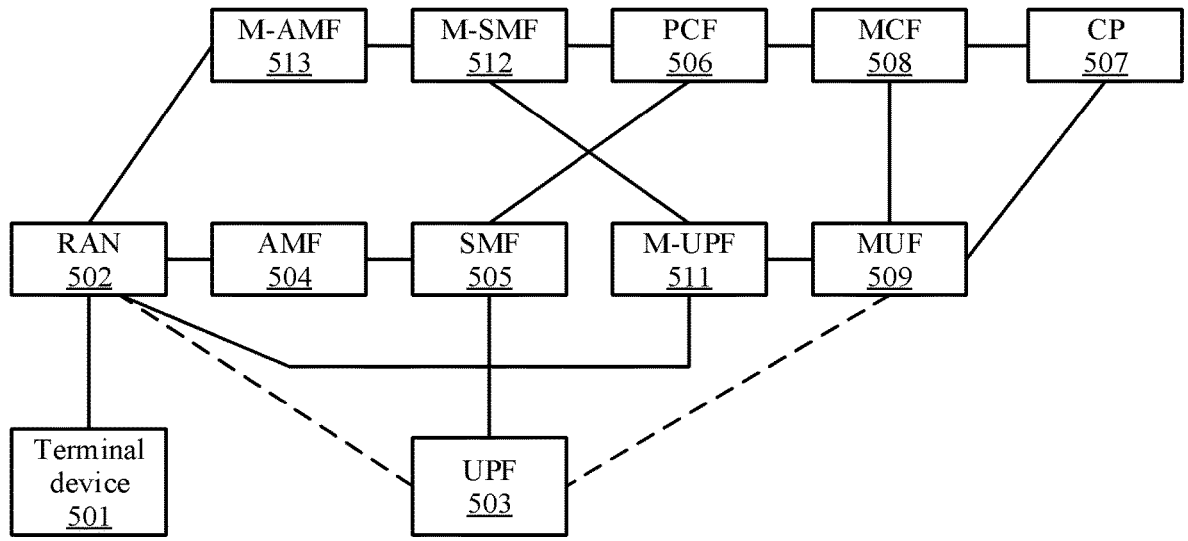
FIG. 5 is a schematic diagram 4 of an architecture of a communication system according to an embodiment of this application.
Figure 6:
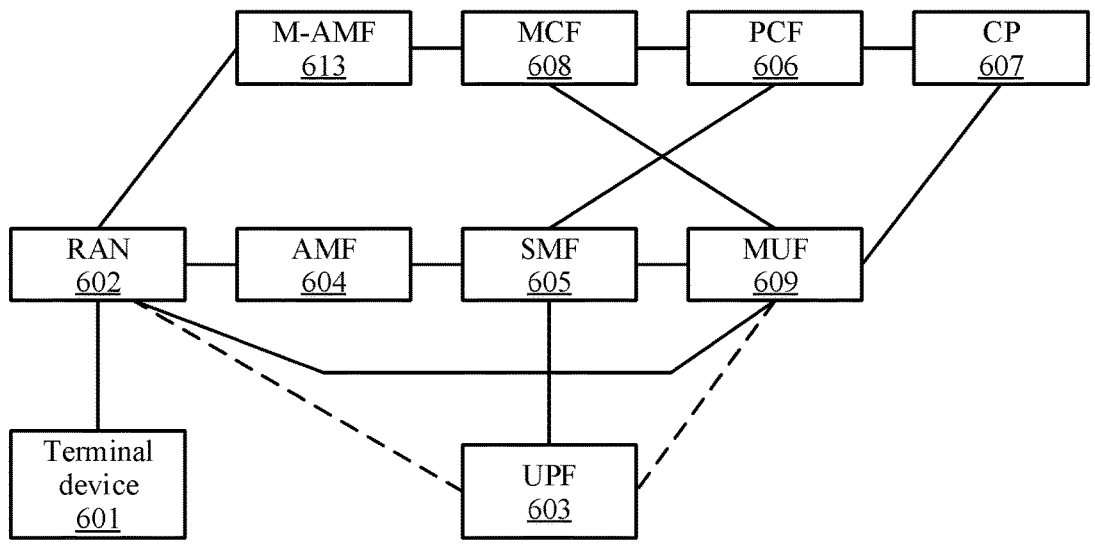
FIG. 6 is a schematic diagram 5 of an architecture of a communication system according to an embodiment of this application.

For example, FIG. 4 to FIG. 6 are schematic diagrams 3 to 5 of architectures of communication systems to which communication methods according to embodiments of this application are applicable, namely, three examples formed by combining the communication system shown in FIG. 1 or FIG. 2 with the 5G communication system in the non-roaming scenario shown in FIG. 3. Details are separately described below.

As shown in FIG. 4, the communication system includes but is not limited to a terminal device 401, a RAN network element 402, a UPF network element 403, an AMF network element 404, an SMF network element 405, a PCF network element 406, a network element 407 in a content provider (CP) network (CP network element), and network elements newly introduced in embodiments of this application, such as a multicast control function (MCF) network element 408 and a multicast user plane function (MUF) network element 409. The CP network element 407 is a network element deployed by providers of third-party applications, such as WeChat, an online game, and video on demand, and may be located in the DN 311 shown in FIG. 3.

The MCF network element 408 is configured to control an MBS. The MCF network element 408 may receive MBS information through an interface between the MCF network element 408 and the CP network element 407, and create a session resource for the MBS through an interface between the MCF network element 408 and the PCF network element 406, for example, create an MBS session. The MUF network element 409 is configured to transfer a multicast packet, for example, receive a data packet of the MBS from the CP network element 407, and forward the data packet to the UPF network element 403.

Optionally, in the network architectural diagram shown in FIG. 4, a function of the MCF network element 408 may alternatively be integrated into the PCF network element 406. Similarly, a function of the MUF network element 409 may alternatively be integrated into the UPF network element 403. For example, the PCF network element 406 and the UPF network element 403 shown in FIG. 4 may be respectively a multicast policy control function (MBS policy control function, M-PCF) network element 410 and a multicast user plane function (MBS user plane function, M-UPF) network element 411 (all shown in dashed boxes in FIG. 4). Implementations of the MCF network element 408 and the MUF network element 409 are not specifically limited in this embodiment of this application.

In this embodiment of this application, as shown in FIG. 4, the SMF network element 405 and the AMF network element 404 that provide a unicast service for the terminal device 401 may allocate an MBS resource to the terminal device 401. Alternatively, a multicast session management function (MBS session management function, M-SMF) network element 512 and a multicast access and mobility management function (MBS access and mobility management function, M-AMF) network element 513 shown in FIG. 5 may allocate an MBS resource to the terminal device 401.

As shown in FIG. 5, the communication system includes but is not limited to a terminal device 501, a RAN network element 502, a UPF network element 503, an AMF network element 504, an SMF network element 505, an M-UPF network element 511, an M-AMF network element 513, an M-SMF network element 512, a PCF network element 506, an MCF network element 508, an MUF network element 509, and a CP network element 507.

The AMF network element 504, the SMF network element 505, and the UPF network element 503 are network elements that provide a unicast service for the terminal device 501. For example, unicast data may be sent by the UPF network element 503 to the RAN 502, and then sent by the RAN 502 to the terminal device 501. The M-AMF network element 513 and the M-SMF network element 512 are network elements dedicated to MBS management and control. For example, the M-AMF network element 513 and the M-SMF network element 512 may allocate the MBS resource to the terminal device 501, create an MBS session, and the like. In actual application, the M-SMF 512 and the M-AMF 513 may alternatively be network elements that provide the unicast service for the terminal device 501. For example, when the RAN 502 supports an MBS, data of the MBS may be sent by the MUF network element 509 to the RAN through the M-UPF network element 511, and then sent by the RAN 502 to the terminal device 501. For another example, when the RAN 502 does not support the MBS, the data of the MBS may alternatively be sent by the MUF network element 509 to the UPF network element 503, and then the UPF network element 503 sends the data of the MBS to the terminal device 501 through the RAN 502 by using a unicast resource (as shown by dashed lines in FIG. 5).

Alternatively, optionally, with reference to FIG. 4, the function of the MCF network element 408 may be integrated into the SMF network element 405, and deployed between the AMF network element 404 and the PCF network element 406.

As shown in FIG. 6, the communication system includes but is not limited to a terminal device 601, a RAN network element 602, a UPF network element 603, an AMF network element 604, an SMF network element 605, an M-AMF network element 613, an MCF network element 608, a PCF network element 606, an MUF network element 609, and a CP network element 607. The CP network element 607 may send information of the MBS to the PCF network element 606 or a network exposure function (NEF) network element (not shown). For example, the CP network element 607 may first send the information of the MBS to the NEF network element, and then the NEF network element sends the information of the MBS to the PCF network element 606. Then, the MCF network element 608 may obtain a policy control and charging (PCC) rule corresponding to the MBS from the PCF network element 606, so as to create a corresponding MBS session for the MBS.

In this way, as shown in FIG. 6, data of the MBS may be directly sent from the MUF network element 609 to the RAN network element 602, and then sent by the RAN network element 602 to the terminal device 601. Optionally, when the data of the MBS is sent to the terminal device 601 in a unicast manner, if the RAN network element does not support the MBS, the MUF network element 609 may alternatively send the data of the MBS to the UPF network element 603, and then the UPF network element 603 sends the data of the MBS to the RAN network element in the unicast manner.

In the communication system shown in FIG. 6, the MCF network element 608 communicates with the RAN network element 602 through the M-AMF network element 613. It should be understood that the M-AMF network element 613 may also provide a unicast service for the terminal device 601. In addition, the SMF network element 605 that provides the unicast service for the terminal device 601 may obtain the information of the MBS from the PCF network element 606.

The foregoing various access network elements may also be referred to as access network devices, and usually are devices that are located on a network side of the foregoing communication system and that have a wireless transceiver function, or chips or chip systems that can be disposed in the devices. The access network element includes but is not limited to an access point (AP) in a Wi-Fi system, such as a home gateway, a router, a server, a switch, and a bridge, an evolved NodeB (eNB), a radio network controller (RNC), a NodeB (NB), a base station controller (BSC), a base transceiver station (BTS), a home base station (for example, a home evolved NodeB or a home NodeB (HNB)), a baseband unit (BBU), a wireless relay node, a wireless backhaul node, a transmission point (for example, a transmission and reception point (TRP) or a transmission point (TP)), or the like. The access network element may alternatively be a next generation NodeB (gNB) or a transmission point (e.g., TRP or TP) in a 5G system, for example, a NR system, or one antenna panel or a group of antenna panels (including a plurality of antenna panels) of a base station in the 5G system. The access network element may alternatively be a network node, such as a BBU, a distributed unit (DU), or a road side unit (RSU) having a base station function, that constitutes a gNB or a transmission point.

The terminal device is a terminal that accesses the communication system and that has a wireless transceiver function, or a chip or a chip system that may be disposed in the terminal. The terminal device may also be referred to as a user apparatus, an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet (Pad), a computer having a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, a vehicle-mounted terminal, an RSU that has a terminal function, or the like. The terminal device in this application may alternatively be a vehicle-mounted module, a vehicle-mounted, a vehicle-mounted component, a vehicle-mounted chip, or a vehicle-mounted unit that is built in a vehicle as one or more components or units. The vehicle uses the vehicle-mounted module, the vehicle-mounted, the vehicle-mounted component, the vehicle-mounted chip, or the vehicle-mounted unit that is built in the vehicle, to implement a communication method provided in this application.

Network elements other than the terminal device, the various access network elements, and the CP network element, may also be collectively referred to as core network elements. The UPF network element is a user plane network element, and other core network elements may also be collectively referred to as control plane network elements. Further, corresponding to the terminal device, the foregoing various access network elements and various core network elements may also be collectively referred to as network devices.

It should be understood that FIG. 1 to FIG. 6 are merely simplified schematic diagrams of examples for ease of understanding. The communication system provided in embodiments of this application may further include another network element and/or another terminal device that are/is not shown in FIG. 1 to FIG. 6.

Figure 7:
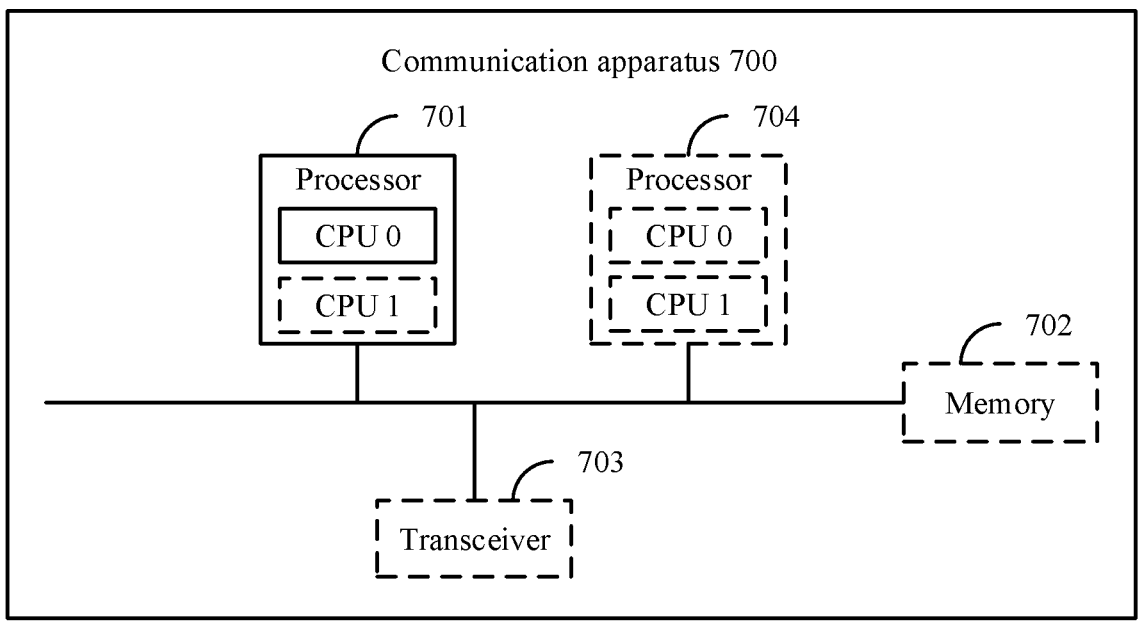
FIG. 7 is a schematic diagram 1 of a structure of a communication apparatus according to an embodiment of this application.

For example, FIG. 7 is a schematic diagram 1 of a structure of a communication apparatus that can be configured to perform a communication method according to an embodiment of this application.

In a possible design solution, a communication apparatus 700 may be a network element having a session management function in the communication system shown in any one of FIG. 1 to FIG. 6, for example, the session management network element shown in FIG. 1 or FIG. 2, the SMF network element shown in FIG. 3 to FIG. 6, or a chip or a chip system disposed in the foregoing network element having the session management function.

In another possible design solution, the communication apparatus 700 may be a network element having a function of the first network element in the communication system shown in any one of FIG. 1 to FIG. 6, for example, the first network element 103 shown in FIG. 1, the source access network element 203 or the user plane network element 205 shown in FIG. 2, the UPF network element 303-603, the M-UPF network element 411, or the MUF network element 409-609 shown in FIG. 3 to FIG. 6, or a chip or a chip system in the network element having the function of the first network element 103.

As shown in FIG. 7, the communication apparatus 700 may include a processor 701. Optionally, the communication apparatus 700 may further include a memory 702 and/or a transceiver 703. The processor 701 is coupled to the memory 702 and/or the transceiver 703. "Coupled" means that there is an electrical signal connection, for example, a connection implemented through a communication bus.

The following describes each component of the communication apparatus 700 in detail with reference to FIG. 7.

The processor 701 is a control center of the communication apparatus 700, and may be one processor, or may be a collective term of a plurality of processing elements. For example, the processor 701 is one or more central processing units (CPU), or may be an application-specific integrated circuit (ASIC), or may be one or more integrated circuits configured to implement embodiments of this application, for example, one or more microprocessors (e.g., digital signal processors (DSPs)), or one or more field programmable gate arrays (FPGAs).

The processor 701 may perform various functions of the communication apparatus 700 by running or executing a software program stored in the memory 702 and invoking data stored in the memory 702.

During certain implementation, in an embodiment, the processor 701 may include one or more CPUs, such as a CPU 0 and a CPU 1 shown in FIG. 7.

During certain implementation, in an embodiment, the communication apparatus 700 may alternatively include a plurality of processors, for example, the processor 701 and a processor 704 shown in FIG. 7. Each of the processors may be a single-core processor (single-CPU) or may be a multi-core processor (multi-CPU). The processor herein may be one or more communication devices, circuits, and/or processing cores configured to process data (for example, computer program instructions).

The memory 702 may be a read-only memory (ROM), another type of static storage communication device capable of storing static information and instructions, a random-access memory (RAM), or another type of dynamic storage communication device capable of storing information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium, another magnetic storage communication device, or any other medium capable of carrying or storing expected program code in a form of instructions or data structures and capable of being accessed by a computer, but is not limited thereto. The memory 702 may be integrated with the processor 701, or may exist independently, and is coupled to the processor 701 through an input/output port (not shown in FIG. 7) of the communication apparatus 700. This is not specifically limited in this embodiment of this application.

The memory 702 is configured to store a software program for executing the solutions of this application, and the processor 701 controls the execution, to implement a function of the session management network element, the first network element, the source access network element, or the user plane network element in the communication methods provided in embodiments of this application. For an example implementation, refer to the following method embodiments. Details are not described herein.

The transceiver 703 is configured for communication with another communication apparatus. The communication system shown in FIG. 1 is used as an example. The communication apparatus 700 may be the session management network element, and the transceiver 703 may be configured for communication between the session management network element and the first network element. Alternatively, the communication apparatus 700 may be the first network element, and the transceiver 703 may be configured for communication between the first network element and the session management network element or the terminal device. Optionally, the transceiver 703 may include a receiver and a transmitter (not separately shown in FIG. 7). The receiver is configured to implement a receiving function of the communication apparatus 700, and the transmitter is configured to implement a sending function of the communication apparatus 700.

Further, the transceiver 703 may be integrated with the processor 701, or may exist independently, and is coupled to the processor 701 through an input/output port (not shown in FIG. 7) of the communication apparatus 700.

It should be noted that a structure of the communication apparatus 700 shown in FIG. 7 does not constitute a limitation on the communication apparatus provided in this embodiment of this application. An actual communication apparatus may include more or fewer components than those shown in the figure, or combine some components, or have different component arrangements. This is not specifically limited in this embodiment of this application.

Figure 8:
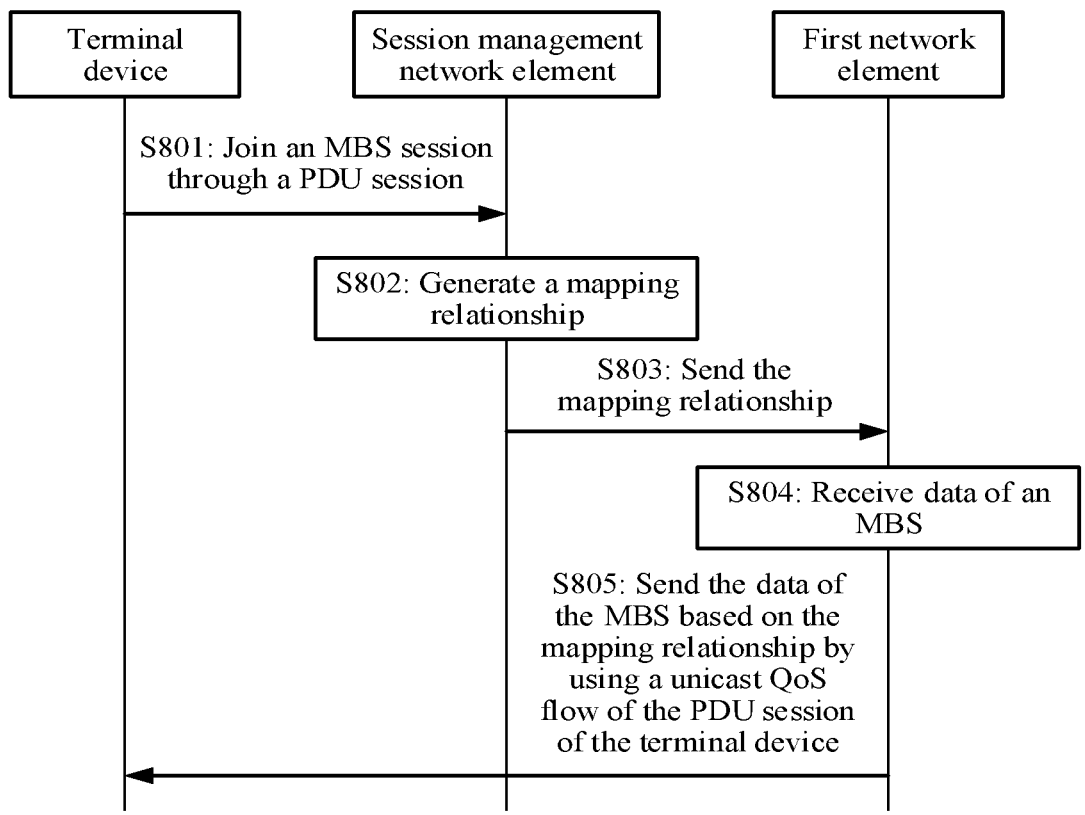
FIG. 8 is a schematic flowchart of a communication method according to an embodiment of this application.
Figure 9:
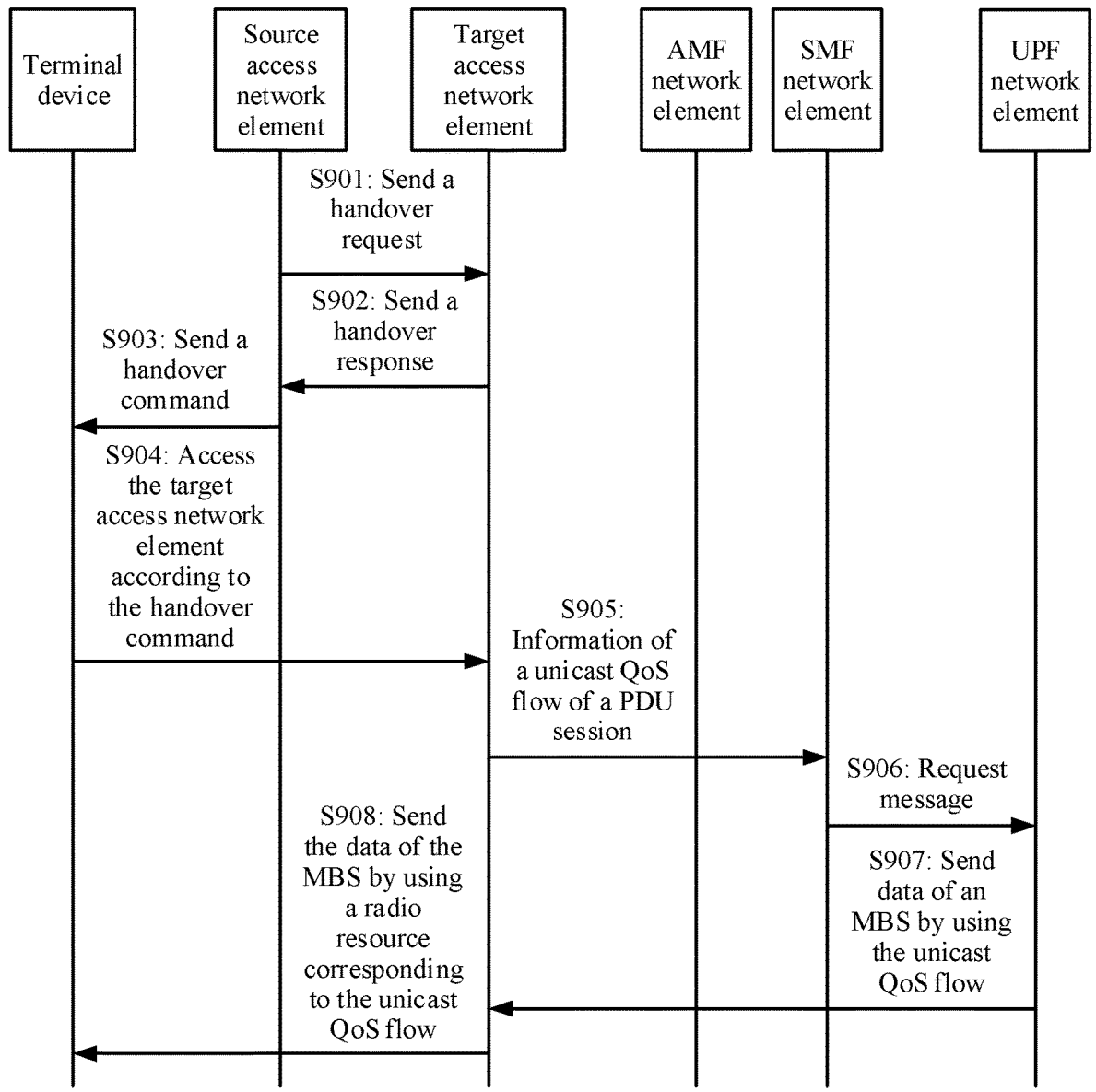
FIG. 9 is a schematic flowchart of another communication method according to an embodiment of this application.

The following describes in detail the communication methods provided in embodiments of this application with reference to FIG. 8 and FIG. 9.

FIG. 8 is a schematic flowchart of a communication method according to an embodiment of this application. The communication method is applicable to the communication system shown in any one of FIG. 1, FIG. 2, or FIG. 4 to FIG. 6. The following uses the communication system shown in FIG. 1 as an example for description.

As shown in FIG. 8, the communication method includes the following S801 to S805.

S801: A terminal device joins an MBS session through a PDU session.

The MBS session may include a tunnel used to carry data of an MBS, and may further include a radio resource used to send the data of the MBS. For example, an access network element receives the data of the MBS through the MBS session, and sends the data of the MBS to one or more terminal devices by using the radio resource. One MBS session may include one or more multicast QoS flows, and may be used to transmit data flows meeting different QoS requirements in the MBS session. In other words, the data of the MBS may be transmitted by using one or more multicast QoS flows, that is, the one or more multicast QoS flows carry the data of the MBS.

In an example, the terminal device may send an internet group management protocol (IGMP) message to a session management network element through an established PDU session. The IGMP message is used to request to join the MBS session. The IGMP message may carry an application identifier corresponding to the MBS and an identifier of the terminal device.

"A terminal device joins an MBS session" may mean that the terminal device joins the MBS, that is, the terminal device starts to receive the data of the MBS. For example, the terminal device, as a new member, requests, through the PDU session of the terminal device, to use the session that carries the MBS to receive the data of the MBS. The session that carries the MBS may have been created by the session management network element based on a request of another terminal device. Alternatively, creation of the MBS session may be triggered by a request of the terminal device for "joining the MBS session".

The identifier of the terminal device may be used to identify the terminal device, for example, an international mobile subscriber identity (IMSI), or an external identifier of the terminal, for example, a mobile station international subscriber directory number (MSISDN).

The application identifier corresponding to the MBS may include a multicast address of the MBS. Optionally, the application identifier corresponding to the MBS further includes a source address that provides the MBS, namely, an address of an operator network element that provides the MBS, for example, an address of an AF network element or a CP network element, or an address of a third-party application server.

It should be noted that, in addition to joining the MBS session through a user plane path in S801, the terminal device may alternatively join the MBS session through a control plane path. Therefore, that the terminal device joins the MBS session through the PDU session in this application may be replaced with that the terminal device joins the MBS session by using a non-access stratum (NAS) message of the PDU session. The NAS message of the PDU session may be a NAS message that carries an identifier of the PDU session. This is not limited. For example, the NAS message of the PDU session may be a PDU session modification request message, a PDU session establishment request message, or a newly added NAS message of the PDU session. This is not limited.

It should be noted that when the terminal device sends, by using a NAS message, a request message for joining the MBS session, if the terminal device has obtained the identifier corresponding to the MBS, the terminal device may add the identifier corresponding to the MBS to the request message, or the terminal device may add the multicast address and the source address corresponding to the MBS to the request message to identify the MBS.

S802: The session management network element generates a mapping relationship.

The mapping relationship may be a mapping relationship between the multicast QoS flow of the MBS and a unicast QoS flow of the PDU session in S801. For example, the mapping relationship may include a correspondence between information of the multicast QoS flow and information of the unicast QoS flow of the PDU session.

The multicast QoS flow of the MBS may also be referred to as a multicast QoS flow of the MBS session. This is not limited. Both the multicast QoS flow of the MBS and the unicast QoS flow of the PDU session are used to transmit the data of the MBS.

The information of the multicast QoS flow may include one or more of the following. An identifier of the multicast QoS flow and a QoS parameter of the multicast QoS flow. The information of the unicast QoS flow may include one or more of the following. An identifier of the unicast QoS flow and a QoS parameter of the unicast QoS flow.

For example, the identifier of the unicast QoS flow may be a QoS flow identifier (QoS flow identifier, QFI). The identifier of the multicast QoS flow may also be a QFI. The session management network element may allocate a QFI to the unicast QoS flow corresponding to the multicast QoS flow.

Optionally, in step S802, the session management network element obtains the information of the multicast QoS flow of the MBS, and determines the unicast QoS flow corresponding to the multicast QoS flow, to generate the mapping relationship. Details are as follows.

For example, the session management network element may obtain the information of the multicast QoS flow of the MBS from another network element (for example, a PCF network element), or may determine the information of the multicast QoS flow of the MBS based on information of the MBS. The information of the MBS may be a policy and charging control (PCC) rule of the MBS. For details about how to determine the information of the multicast QoS flow according to the PCC rule, refer to a conventional technology. Details are not described again.

Further, the session management network element determines the unicast QoS flow corresponding to the multicast QoS flow, and generates the mapping relationship. For example, it is assumed that the session management network element maps different multicast QoS flows to different unicast QoS flows, that is, the multicast QoS flows are in a one-to-one correspondence with the unicast QoS flows. In this case, the mapping relationship is a one-to-one mapping relationship. For another example, it is assumed that a plurality of multicast QoS flows are mapped to a same unicast QoS flow. In this case, the mapping relationship is a many-to-one mapping relationship.

Optionally, it is assumed that the mapping relationship includes the QoS parameter of the multicast QoS flow and the QoS parameter of the unicast QoS flow. In this case, step S802 further includes that the session management network element determines the QoS parameter of the unicast QoS flow based on the QoS parameter of the multicast QoS flow.

In a case, if the unicast QoS flow is in a one-to-one correspondence with the multicast QoS flow, the QoS parameter of the unicast QoS flow may be the same as or different from the QoS parameter of the multicast QoS flow.

For example, the session management network element determines a parameter of the unicast QoS flow based on a parameter of the multicast QoS flow, for example, increases or decreases a scheduling priority in the QoS parameter of the multicast QoS flow, to obtain a scheduling priority in the QoS parameter of the unicast QoS flow of the PDU session.

In another case, if a plurality of multicast QoS flows are mapped to one unicast QoS flow, the session management network element may determine the QoS parameter (namely, a unicast QoS parameter) of the unicast QoS flow based on QoS parameters (namely, multicast QoS parameters) of the multicast QoS flows mapped to the unicast QoS flow. For example, a bandwidth of the unicast QoS flow is a sum of bandwidths of all multicast QoS flows, and the session management network element may also adjust another parameter, for example, the scheduling priority. This is not limited in this embodiment of this application.

It should be noted that the unicast QoS flow corresponding to the multicast QoS flow may be used to transmit data of only one MBS. In other words, the unicast QoS flow is not used to send non-MBS data or transmit data of another MBS.

In addition, if the unicast QoS parameter is the same as the multicast QoS parameter, the mapping relationship may not include the QoS parameter.

S803: The session management network element sends the mapping relationship to a first network element.

Correspondingly, the first network element receives the mapping relationship from the session management network element.

The mapping relationship may be used by the first network element to send the data of the MBS to the terminal device by using the unicast QoS flow of the PDU session of the terminal device.

The first network element may be an access network element or a user plane network element.

It should be noted that if the unicast QoS parameter is the same as the multicast QoS parameter, the session management network element may send the unicast QoS parameter or the multicast QoS parameter to the access network element, or the session management network element may send the unicast QoS parameter and the multicast QoS parameter to the access network element. For example, the mapping relationship includes the unicast QoS parameter and the multicast QoS parameter.

S804: The first network element receives the data of the MBS.

In an example, the first network element may directly receive the data of the MBS from a third-party network element (for example, an application server). For example, the first network element is a user plane network element that has an interface with the third-party network element. The user plane network element may directly receive a data packet of the MBS from the third-party network element through the interface.

In another example, the first network element may alternatively receive the data of the MBS from another operator network element, for example, an M-UPF network element or another UPF network element. For example, if the first network element is a user plane network element that has no interface with the third-party network element, the user plane network element may receive a data packet of the MBS from another operator network element (for example, another user plane network element). For another example, the first network element is an access network element, and the first network element may receive a data packet of the MBS from a user plane network element.

The data packet of the MBS includes the data of the MBS and encapsulation information of the MBS. The encapsulation information of the MBS may include the information of the MBS session in S802, for example, the identifier of the multicast QoS flow.

S805: The first network element sends the data of the MBS to the terminal device based on the mapping relationship by using the unicast QoS flow of the PDU session of the terminal device.

Correspondingly, the terminal device receives the data of the MBS from the first network element by using the unicast QoS flow of the PDU session.

The following may describe step S805 in detail in two cases.

Case 1: The first network element is an access network element. The data of the MBS is carried in a first data packet. The first data packet includes the identifier of the multicast QoS flow.

Correspondingly, S805 may include that an access network element determines the unicast QoS flow based on the mapping relationship. In other words, the access network element converts the data packet of the MBS into a unicast data packet, and sends the data of the MBS to the terminal device in a unicast manner.

For example, the first network element may query the mapping relationship based on the identifier of the multicast QoS flow carried in the first data packet, to obtain the identifier of the unicast QoS flow corresponding to the identifier of the multicast QoS flow, and determine, based on the identifier of the unicast QoS flow, a radio resource corresponding to the identifier of the unicast QoS flow, so as to send the data of the MBS to the terminal device by using the radio resource.

Further, before S805, the communication method shown in FIG. 8 further includes that before the first network element may send the data of the MBS by using the radio resource corresponding to the identifier of the unicast QoS flow, the first network element further needs to configure the radio resource for the terminal device. For example, the first network element may obtain, based on the mapping relationship, a unicast QoS parameter of a unicast QoS flow corresponding to the multicast QoS flow, and configure a radio resource for the unicast QoS flow based on the QoS parameter of the unicast QoS flow, to send the data of the MBS to the terminal device by using the radio resource. In this way, the first network element can more accurately determine the radio resource required for the unicast QoS flow, to avoid insufficiency or limitation of the radio resource. This further improves reliability and efficiency of data transmission of the MBS.

Optionally, before the radio resource is configured based on the unicast QoS parameter of the unicast QoS flow, the communication method shown in FIG. 8 further includes that the access network element determines to send the data of the MBS in the unicast manner. For example, the following manner may be used for implementation.

In a possible implementation, the access network element determines, based on an air interface status of the terminal device, to send the data of the MBS in the unicast manner.

In another possible implementation, the access network element determines to send the data of the MBS in the unicast manner based on one or more of the following. A signal strength of a signal received by the terminal device from the access network element is less than or equal to a strength threshold, and a quantity of terminal devices that receive the MBS through the access network element is less than or equal to a quantity threshold.

In other words, when radio channel quality is poor or the quantity of terminal devices that receive the MBS is small, the data of the MBS may be sent in the unicast manner, to use an idle radio resource corresponding to unicast QoS as much as possible, so that resource utilization is improved.

Case 2: The first network element is a user plane network element. The data of the MBS is carried in a first data packet. The first data packet includes the identifier of the multicast QoS flow.

Correspondingly, S805 may include that a user plane network element determines the identifier of the unicast QoS flow based on the mapping relationship, and sends the data of the MBS and the identifier of the unicast QoS flow. In other words, the user plane network element converts the data packet of the MBS into a unicast data packet, and sends the data of the MBS to the terminal device in a unicast manner.

Optionally, in S803, the session management network element sends the mapping relationship to the user plane network element when the access network element does not support the MBS, so that the user plane network element converts the data packet of the MBS into the unicast data packet, and sends the data of the MBS to the terminal device in the unicast manner. It should be understood that, if the access network element supports the MBS, the access network element supports sending data of a received MBS to one or more terminals. Correspondingly, if the access network element supports the MBS, the access network element may sense the MBS, and sense terminal devices that receive the MBS through the access network element. If the access network element does not support the MBS, the access network element does not support sending data of a received MBS to one or more terminals, and the access network element does not sense the MBS.

It should be noted that the user plane network element sends the data of the MBS to the terminal device through the access network element. For example, the user plane network element first sends the data of the MBS to the access network element by using the unicast QoS flow, and then the access network element sends the data of the MBS to the terminal device by using a radio resource corresponding to the unicast QoS flow.

According to the communication method shown in FIG. 8, after the terminal device joins the MBS session through the PDU session, the first network element may send the data of the MBS to the terminal device by using the unicast QoS flow of the PDU session. For example, the first network element may send the data of the MBS to the terminal device on the radio resource of the unicast QoS flow by using the mapping relationship between the unicast QoS flow of the PDU session used by the terminal device to join the MBS session and the multicast QoS flow of the MBS. Therefore, the data of the MBS can be transmitted without reserving a radio resource for the MBS, and radio resource utilization and communication efficiency are improved.

With reference to the communication system in the handover scenario shown in FIG. 2, the following describes an example implementation, in the handover scenario, of a communication method provided in embodiments of this application.

For example, FIG. 9 is a schematic flowchart of another communication method according to an embodiment of this application. The communication method is applicable to the communication system shown in any one of FIG. 1, FIG. 2, or FIG. 4 to FIG. 6. The session management network element shown in FIG. 2 may be an SMF network element in FIG. 9, and the user plane network element shown in FIG. 2 may be a UPF network element in FIG. 9.

As shown in FIG. 9, the communication method includes the following S901 to S908.

S901: A source access network element sends a handover request to a target access network element.

Correspondingly, the target access network element receives the handover request from the source access network element.

For example, before the source access network element starts a handover procedure, a terminal device receives data of an MBS through the source access network element, and the source access network element has established an MBS session, that is, the source access network element supports the MBS. When the terminal device moves into a coverage area of the target access network element, the source access network element determines to hand over the terminal device to the target access network element, and sends the handover request to the target access network element.

Assuming that the target access network element does not support the MBS, the handover request may include information of a unicast QoS flow of a PDU session corresponding to a multicast QoS flow of the MBS. In other words, there is a mapping relationship between the multicast QoS flow of the MBS and the unicast QoS flow of the PDU session. The information of the unicast QoS flow may include an identifier of the unicast QoS flow, for example, a QFI.

The MBS session may be a tunnel used to carry the data of the MBS. For example, an access network element receives the data of the MBS through the MBS session, and sends the data of the MBS to one or more terminal devices. One MBS session may include one or more multicast QoS flows, and may be used to transmit data flows meeting different QoS requirements in the MBS.

Optionally, before S901 is performed, the communication method shown in FIG. 9 may further include that the source access network element obtains, based on the mapping relationship, the information of the unicast QoS flow corresponding to the multicast QoS flow.

Information of the multicast QoS flow of the MBS (which may also be referred to as the multicast QoS flow of the MBS session) may include an identifier of the multicast QoS flow, and the information of the unicast QoS flow includes the identifier of the unicast QoS flow. Correspondingly, the mapping relationship may include a correspondence between the identifier of the multicast QoS flow and the identifier of the unicast QoS flow.

It should be noted that there may be one or more multicast QoS flows of the MBS, and there may be one or more unicast QoS flows of the PDU session. Therefore, the correspondence between the identifier of the multicast QoS flow and the identifier of the unicast QoS flow may be understood as a set of correspondences between identifiers of the multicast QoS flows and identifiers of the unicast QoS flows.

Optionally, the information of the multicast QoS flow of the MBS further includes a QoS parameter of the multicast QoS flow, and the information of the unicast QoS flow further includes a QoS parameter of the unicast QoS flow. Correspondingly, the mapping relationship further includes the QoS parameter of the multicast QoS flow and the QoS parameter of the unicast QoS flow. Correspondingly, the source access network element may send a parameter of the unicast QoS flow to the target access network element. In this way, a QoS requirement of the unicast QoS flow corresponding to a QoS requirement of the MBS can be accurately learned of, to accurately determine a data transmission solution of the unicast QoS flow, for example, determine an MCS, a bit error rate, and a transmission delay, and to ensure reliability and efficiency of transmitting the data of the MBS.

Further, based on the mapping relationship, the source access network element may convert a data packet of the MBS received from the UPF network element into a unicast data packet, and forward the unicast data packet to the terminal device. Therefore, before the UPF network element starts to send the data of the MBS to the target access network element, the source access network element converts the received data packet of the MBS into the unicast data packet and forwards the unicast data packet to the target access network element. This can reduce a packet loss in a handover process, ensure continuity of the MBS in the handover process, and improve reliability of the MBS.

Optionally, the communication method shown in FIG. 9 further includes that the source access network element receives the mapping relationship.

For example, the source access network element may receive the mapping relationship from the SMF network element, or may receive the mapping relationship from another network element. For example, when the terminal device is handed over last time, a current source access network element may obtain the mapping relationship from a source access network element from which the terminal device is handed over last time. The current source access network element may obtain the mapping relationship from a handover request sent by the source access network element from which the terminal device is handed over last time. This is not limited in this embodiment of this application.

In an example, the communication method shown in FIG. 9 may further include that the SMF network element sends the mapping relationship to the source access network element. Correspondingly, the source access network element may receive the mapping relationship from the SMF network element. In other words, the source access network element may obtain the mapping relationship from the SMF network element that provides a PDU session service for the terminal device, to obtain the information of the unicast QoS flow corresponding to the multicast QoS flow. In a possible implementation, when the terminal device requests to join the MBS session through the source access network element (as shown in FIG. 8), or when the terminal device is handed over from a previous source access network element to the current source access network element, the SMF network element sends the mapping relationship.

The mapping relationship may be generated by the SMF network element. For generating the mapping relationship by the SMF network element, refer to the descriptions of FIG. 8. Details are not described herein again.

Optionally, before S901 is performed, the communication method shown in FIG. 9 further includes that the source access network element receives a first data packet from the UPF network element. The first data packet includes the identifier of the multicast QoS flow and the data of the MBS. Then, the source access network element sends the data of the MBS to the terminal device in a PTM manner. In other words, the source access network element sends data of a received MBS to one or more terminal devices. Alternatively, the source access network element may map the first data packet to a unicast data packet, and send the data of the MBS to the terminal device by using the unicast QoS flow. For details, refer to related descriptions of the communication method shown in FIG. 8. Details are not described herein again.

It should be noted that, in step S901, the source access network element may determine, based on a capability (for example, whether the MBS is supported) of the target access network element, certain content included in the handover request.

Optionally, before S901 is performed, the communication method shown in FIG. 9 further includes that the source access network element obtains capability information of the target access network element. Then, the source access network element generates the handover request based on the capability information of the target access network element.

For example, the source access network element may obtain the capability information of the target access network element from an OAM network element or the SMF network element, or obtain the capability information of the target access network element from the target access network element. Assuming that the capability information is obtained from the target access network element, the target access network element may provide the capability information of the target access network element based on a request of the source access network element, or may actively provide the capability information, that is, the source access network element receives the capability information of the target access network element. This is not limited.

The capability information may include information used to indicate that the target access network element does not support the MBS.

It should be noted that, when the capability information is obtained from the target access network element, a target access network element that does not support the MBS may not provide the capability information, but a target access network element that supports the MBS may provide the capability information. In this way, if the source access network element does not receive the capability information that is provided by the target access network element and indicates that the MBS is supported, it may be considered that the target access network element does not support the MBS.

In this way, the source access network element may determine, based on the capability information, a handover solution for handing over the terminal device from the source access network element to the target access network element, for example, may determine content carried in the handover request, so that a handover success rate and MBS data transmission reliability can be further improved.

In another possible design manner, the capability information of the target access network element may be obtained from local configuration information (for example, neighboring cell configuration information) of the source access network element.

S902: The target access network element sends a handover response to the source access network element.

Correspondingly, the source access network element receives the handover response from the target access network element.

The handover response may include configuration information of a radio resource corresponding to the unicast QoS flow.

For example, the target access network element configures the radio resource of the unicast QoS flow for the terminal device based on the information that is of the unicast QoS flow and that is received from the source access network element, and sends the radio resource of the unicast QoS flow to the source access network element by using the handover response. In other words, the target access network element may configure the radio resource for the terminal device in advance, so that a quantity of interactions when the terminal device is handed over to a target base station can be reduced, a handover delay is reduced, and the handover success rate is improved.

Optionally, the handover response further includes information of a forwarding tunnel of a PDU session between the source access network element and the target access network element, so that before the UPF network element starts to send the data of the MBS to the target access network element, the source access network element forwards the data of the MBS to the target access network element, and then the target access network element forwards the data to the terminal device. This can reduce a packet loss rate in the handover process, and further improve reliability of the MBS. For an example implementation of the forwarding tunnel, refer to a conventional technology. Details are not described in this embodiment of this application.

S903: The source access network element sends a handover command to the terminal device.

Correspondingly, the terminal device receives the handover command from the source access network element.

The handover command may include the configuration information of the radio resource mentioned in S902.

For example, after the source access network element sends the handover command to the terminal device, the source access network element stops sending any data to the terminal device, and may forward the data of the MBS to the target access network element through the forwarding tunnel of the PDU session.

In an example, the communication method shown in FIG. 9 may further include that the source access network element receives the first data packet from a user plane network element, and the source access network element sends a second data packet to the target access network element.

The first data packet includes the identifier of the multicast QoS flow and the data of the MBS. The second data packet includes the identifier of the unicast QoS flow and the data of the MBS. In other words, the source access network element may convert a data packet of the MBS received from the user plane network element into a unicast data packet, and forward the unicast data packet to the terminal device, so that after being handed over from the source access network element to the target access network element, the terminal device can continue to receive the data of the MBS from the target access network element. In this way, the packet loss in the handover process is reduced, and reliability of the MBS is further improved.

S904: The terminal device accesses the target access network element according to the handover command.

For example, the terminal device may access the target access network element on the radio resource, based on the configuration information that is of the radio resource and that is carried in the handover command. The radio resource is configured by the target access network element before handover, and the terminal device does not need to apply for the radio resource when accessing the target access network element. In other words, the radio resource is reserved by the target access network element for the terminal device. This can avoid a case in which the terminal device cannot be handed over to the target access network element because the target access network element has no sufficient radio resource, improve the handover success rate, reduce the quantity of interactions between the terminal device and the target access network element when the terminal device is handed over to the target access network element, and reduce the handover delay.

S905: The target access network element sends the information of the unicast QoS flow of the PDU session to the SMF network element through an AMF network element.

Correspondingly, the SMF network element receives the information of the unicast QoS flow of the PDU session from the target access network element.

The unicast QoS flow of the PDU session corresponds to the multicast QoS flow of the MBS. The information of the unicast QoS flow of the PDU session may include the identifier of the unicast QoS flow.

For example, after the terminal device accesses the target access network element, that is, after the handover succeeds, the target access network element may send a path switch message to the session management network element through the AMF network element. The path switch message includes the information of the unicast QoS flow of the PDU session corresponding to the multicast QoS flow of the MBS.

It should be noted that when the PDU session includes a plurality of unicast QoS flows, even if the PDU session is successfully switched, some unicast QoS flows may fail to be switched. Therefore, the target access network element may further send information of a QoS flow that fails to be switched in the PDU session to the SMF network element through the AMF network element, for example, may send the information to the SMF network element by using an N2 SM message.

S906: The SMF network element sends a request message to the UPF network element.

Correspondingly, the UPF network element receives the request message from the SMF network element.

The request message is used to request the UPF network element to send the data of the MBS to the target access network element by using the unicast QoS flow of the PDU session.

In a first case, the request message may include the identifier of the multicast QoS flow and the identifier of the unicast QoS flow corresponding to the multicast QoS flow of the MBS. For example, when a plurality of (two or more) multicast QoS flows are mapped to the unicast QoS flow, the request message may include identifiers of the plurality of multicast QoS flows.

For example, the SMF network element may send a session modification request message to the user plane network element. The session modification request message carries the mapping relationship. The session modification request message carries the identifier of the multicast QoS flow and the identifier of the unicast QoS flow, so that after receiving the data of the MBS and the identifier of the multicast QoS flow corresponding to the data, the user plane network element sends the data of the MBS and the identifier of the unicast QoS flow to the target access network element. Then, the target access network element may send the data of the MBS to the terminal device based on the identifier of the unicast QoS flow. In this way, after being handed over from the source access network element to the target access network element that does not support the MBS, the terminal device can continue to receive the data of the MBS. This ensures continuity of the MBS when the terminal device moves across access network elements with different capabilities, and improves reliability of the MBS.

Optionally, with reference to the first case, the method further includes that the SMF network element obtains the information of the multicast QoS flow based on the mapping relationship and the information of the unicast QoS flow.

For example, the SMF network element may query the mapping relationship based on the information of the unicast QoS flow provided by the target access network element, to obtain the information of the corresponding multicast QoS flow.

The information of the unicast QoS flow may include the identifier of the unicast QoS flow. Because the unicast QoS flow may be used to transmit data of only one MBS, the corresponding MBS may be uniquely determined based on the identifier of the unicast QoS flow.

The mapping relationship may be generated and stored by the SMF network element by using the method shown in FIG. 8. This is not limited.

In a second case, the request message may include the identifier of the unicast QoS flow and identification information of the MBS. The identification information of the MBS may be used to identify the MBS. For example, the identification information of the MBS may include one or more of a target address, a source address, a port number, or the like.

Optionally, with reference to the first case, the method further includes that the SMF network element obtains the identification information of the MBS based on the information of the unicast QoS flow.

For example, because the unicast QoS flow may be used to transmit data of only one MBS, the SMF network element may uniquely determine the corresponding MBS based on the information of the unicast QoS flow provided by the target access network element, to obtain the identification information of the MBS. For example, the SMF network element may obtain the identification information of the MBS from information stored in the SMF network element, or may obtain the identification information of the MBS from another network element. This is not limited.

S907: The UPF network element sends the data of the MBS to the target access network element by using the unicast QoS flow.

Correspondingly, the target access network element receives the data of the MBS from the UPF network element by using the unicast QoS flow.

In an example, in S907, that the UPF network element sends the data of the MBS to the target access network element by using the unicast QoS flow may include that the UPF network element sends a third data packet to the target access network element by using the unicast QoS flow. The third data packet includes the data of the MBS and the identifier of the unicast QoS flow, and the unicast QoS flow is a unicast QoS flow corresponding to the multicast QoS flow. In other words, the third data packet may be generated by the UPF network element by encapsulating the data of the MBS by using tunnel information of the PDU session.

It should be noted that if a user plane network element connected to the source access network element and a user plane network element connected to the target access network element are not a same user plane network element, the user plane network element connected to the target access network element may not join the MBS session, that is, the user plane network element connected to the target access network element may not receive the data of the MBS. Therefore, the session management network element may further indicate the user plane network element connected to the target access network element to join the MBS session, to receive the data of the MBS and send the data of the MBS to the target access network element.

For example, the session management network element may send multicast information to the user plane network element connected to the target access network element, and the user plane network element connected to the target access network element may send an IGMP join request message. The IGMP join request message is used to enable the user plane network element connected to the target access network element to join the MBS session. The IGMP join request message may include internet protocol (IP) multicast information of the MBS session, for example, a multicast address and a source address. In addition, the session management network element may further send a multicast tunnel identifier to the user plane network element connected to the target access network element. The multicast tunnel identifier may be used when the user plane network element connected to the target access network element receives the data of the MBS from another core network element. For details about the another core network element, refer to the following descriptions.

Optionally, the user plane network element connected to the target access network element may receive the data of the MBS from the another core network element, for example, an MUF network element, another M-UPF network element, or a UPF network element, or receive the data of the MBS from an external network, for example, a CP network element. Details are separately described below.

For example, the user plane network element connected to the target access network element may be the UPF network element shown in FIG. 5 or FIG. 6, or the M-UPF network element shown in FIG. 5. The M-UPF network element or the UPF network element may receive the data of the MBS from the MUF network element, and forward the data to the target access network element.

For example, the user plane network element connected to the target access network element may alternatively be the MUF network element shown in FIG. 5 or FIG. 6. The MUF network element may receive the data of the MBS from the CP network element, and forward the data to the target access network element.

In another example, when the user plane network element connected to the source access network element and the user plane network element connected to the target access network element are a same user plane network element, the UPF network element may alternatively send the first data packet to the source access network element by using the multicast QoS flow of the MBS. The first data packet includes the data of the MBS and the identifier of the multicast QoS flow. Then, the source access network element may convert the first data packet into the second data packet including the identifier of the unicast QoS, and send the second data packet to the target access network element. The unicast QoS flow is a unicast QoS flow corresponding to the multicast QoS flow.

It should be noted that if encapsulation information of a data packet that includes the data of the MBS and that is received by the UPF network element, for example, general packet radio service (GPRS) tunneling protocol-user plane (GPRS-user plane, GTP-U) header information, includes the identifier of the multicast QoS flow, the UPF network element may replace the identifier of the multicast QoS flow with the identifier of the unicast QoS flow corresponding to the multicast QoS flow, to generate a unicast data packet. In addition, the UPF network element may further re-encapsulate the GTP-U header, to send the unicast data packet to the target access network element. For example, a tunnel identifier of the GTP-U is replaced with a tunnel identifier of the PDU session. Certainly, if the encapsulation information of the data packet that includes the data of the MBS and that is received by the UPF network element does not include the identifier of the multicast QoS flow, the UPF network element may determine, based on filtering information of the data of the MBS, the identifier of the unicast QoS flow corresponding to the data of the MBS, to generate a unicast data packet. The filtering information may be information of a header of a data packet of the MBS, for example, one or more of a source address, a destination address, a port number, and a protocol number. In this case, the SMF network element may send only the filtering information of the data of the MBS and the identifier of the unicast QoS flow to the UPF network element, and the SMF network element may not send the mapping relationship between the multicast QoS flow and the unicast QoS flow.

S908: The target access network element sends the data of the MBS to the terminal device by using the radio resource corresponding to the unicast QoS flow.

Correspondingly, the terminal device receives the data of the MBS from the target access network element by using the radio resource corresponding to the unicast QoS flow.

For example, after receiving, from the UPF network element or the source access network element, the unicast data packet that carries the data of the MBS, the target access network element may send the unicast data packet to the terminal device by using the radio resource configured before the handover succeeds.

The data packet received by the target access network element may include the data of the MBS and the identifier of the unicast QoS flow. The target access network element determines, based on the identifier of the unicast QoS flow, the radio resource corresponding to the unicast QoS flow, and sends the data of the MBS to the terminal device by using the radio resource.

According to the communication method shown in FIG. 9, in the scenario in which the terminal device is handed over from the source access network element to the target access network element, the source access network element may send the information of the unicast QoS flow of the PDU session corresponding to the multicast QoS flow of the MBS to the target access network element in the handover request, so that after the terminal device is handed over to the target access network element, the target access network element may request the session management network element to indicate the user plane network element connected to the target access network element to send the data of the MBS to the target access network element by using a resource of the unicast QoS flow of the PDU session, and then the target access network element forwards the data of the MBS to the terminal device. This can resolve a problem that the MBS is terminated because the target access network element does not support the MBS after the terminal device is handed over from the source access network element to the target access network element, ensure continuity of the MBS when the terminal device moves across access network elements with different capabilities, and improve reliability of the MBS.

The foregoing describes in detail the communication methods provided in embodiments of this application with reference to FIG. 8 and FIG. 9. The following describes in detail two other communication apparatuses provided in embodiments of this application with reference to FIG. 10 and FIG. 11.

Figure 10:
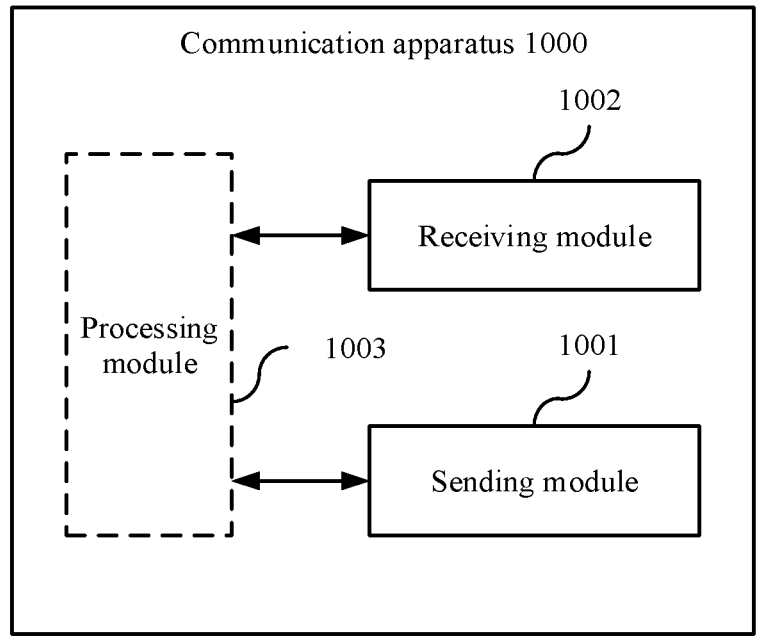
FIG. 10 is a schematic diagram 2 of a structure of a communication apparatus according to an embodiment of this application.

For example, FIG. 10 is a schematic diagram 2 of a structure of a communication apparatus according to an embodiment of this application. As shown in FIG. 10, a communication apparatus 1000 includes a sending module 1001 and a receiving module 1002. For ease of description, FIG. 10 shows only main components of the communication apparatus 1000.

Optionally, in an implementation scenario, the communication apparatus 1000 is applicable to the communication system shown in FIG. 2, and performs a function of the source access network element in the communication method shown in FIG. 9.

The sending module 1001 is configured to send a handover request to a target access network element. The handover request includes information of a unicast QoS flow of a PDU session. The unicast QoS flow corresponds to a multicast QoS flow of an MBS.

The receiving module 1002 is configured to receive a handover response from the target access network element. The handover response includes configuration information of a radio resource corresponding to the unicast QoS flow.

The sending module 1001 is further configured to send a handover command to a terminal device. The handover command includes the configuration information of the radio resource.

In a possible design, the target access network element does not support the MBS.

Optionally, the receiving module 1002 is further configured to receive capability information of the target access network element. The capability information may include information used to indicate that the target access network element does not support the MBS.

In a possible design, the receiving module 1002 is further configured to receive a first data packet from a user plane network element. The first data packet includes an identifier of the multicast QoS flow and data of the MBS. The sending module 1001 is further configured to send a second data packet to the target access network element. The second data packet includes an identifier of the unicast QoS flow and the data of the MBS.

Optionally, the communication apparatus 1000 may further include a processing module 1003. The processing module 1003 is configured to obtain, based on a mapping relationship, the information of the unicast QoS flow corresponding to the multicast QoS flow. The mapping relationship includes a correspondence between the identifier of the multicast QoS flow and the identifier of the unicast QoS flow.

Optionally, the receiving module 1002 is further configured to receive the mapping relationship. Further, the receiving module 1002 is further configured to receive the mapping relationship from a session management network element.

Further, the mapping relationship may further include a correspondence between a multicast QoS parameter and a unicast QoS parameter. The multicast QoS parameter is a QoS parameter of the multicast QoS flow, and the unicast QoS parameter is a QoS parameter of the unicast QoS flow.

In this embodiment of this application, the mapping relationship may be used by the source access network element or the user plane network element to convert a received data packet of the MBS into a corresponding unicast data packet. Alternatively, the mapping relationship may be sent to the terminal device, so that the terminal device learns of, based on the received unicast data packet, information of the multicast QoS flow corresponding to the unicast QoS flow, and sends parsed data of the MBS to a corresponding application program.

Optionally, the communication apparatus 1000 may further include a storage module (not shown in FIG. 10). The storage module stores a program or instructions. When the processing module 1003 executes the program or the instructions, the communication apparatus 1000 is enabled to perform the communication method shown in FIG. 9.

It should be noted that the communication apparatus 1000 may be a source access network element, or may be a chip or a chip system disposed in the source access network element. This is not limited in this application.

In addition, for a technical effect of the communication apparatus 1000, refer to the technical effect of the communication method shown in FIG. 9. Details are not described herein again.

Optionally, in another implementation scenario, the communication apparatus 1000 is applicable to the communication system shown in FIG. 2, and performs a function of the SMF network element in the communication method shown in FIG. 9.

The receiving module 1002 is configured to receive an identifier of a unicast QoS flow of a PDU session from a target access network element. The unicast QoS flow of the PDU session corresponds to a multicast QoS flow of an MBS. The sending module 1001 is configured to send a request message to a user plane network element. The request message is used to request the user plane network element to send data of the MBS to the target access network element by using the unicast QoS flow.

The request message includes an identifier of the multicast QoS flow and the identifier of the unicast QoS flow.

In a possible design, the communication apparatus 1000 may further include a processing module 1003. The processing module 1003 is configured to obtain the identifier of the multicast QoS flow based on a mapping relationship and the identifier of the unicast QoS flow. The mapping relationship includes a correspondence between the identifier of the multicast QoS flow and the identifier of the unicast QoS flow.

Optionally, the mapping relationship may further include a correspondence between a multicast QoS parameter and a unicast QoS parameter. The multicast QoS parameter is a QoS parameter of the multicast QoS flow, and the unicast QoS parameter is a QoS parameter of the unicast QoS flow.

In an example, the sending module 1001 is further configured to send the mapping relationship to a source access network element.

Optionally, the communication apparatus 1000 may further include a storage module (not shown in FIG. 10). The storage module stores a program or instructions. When the processing module 1003 executes the program or the instructions, the communication apparatus 1000 is enabled to perform the communication method shown in FIG. 9.

It should be noted that the communication apparatus 1000 may be a session management network element, or may be a chip or a chip system disposed in the session management network element. This is not limited in this application.

In addition, for a technical effect of the communication apparatus 1000, refer to the technical effect of the communication method shown in FIG. 9. Details are not described herein again.

In yet another implementation scenario, the communication apparatus 1000 is applicable to the communication system shown in FIG. 2, and performs a function of the UPF network element in the communication method shown in FIG. 9.

The receiving module 1002 is configured to receive a request message from a session management network element. The request message is used to request the user plane network element to send data of an MBS to a target access network element by using a unicast QoS flow of a PDU session. The sending module is configured to send the data of the MBS to the target access network element by using the unicast QoS flow.

In a possible design, the sending module 1001 is further configured to send a third data packet to the target access network element by using the unicast QoS flow. The third data packet includes the data of the MBS and an identifier of the unicast QoS flow.

In another possible design, the sending module 1001 is further configured to send a first data packet to a source access network element by using a multicast QoS flow of the MBS. The first data packet includes the data of the MBS and an identifier of the multicast QoS flow.

Optionally, the communication apparatus 1000 may further include a storage module (not shown in FIG. 10). The storage module stores a program or instructions. When the processing module 1003 executes the program or the instructions, the communication apparatus 1000 is enabled to perform the communication method shown in FIG. 9.

It should be noted that the communication apparatus 1000 may be a user plane network element, or may be a chip or a chip system disposed in the user plane network element. This is not limited in this application.

In addition, for a technical effect of the communication apparatus 1000, refer to the technical effect of the communication method shown in FIG. 9. Details are not described herein again.

Figure 11:
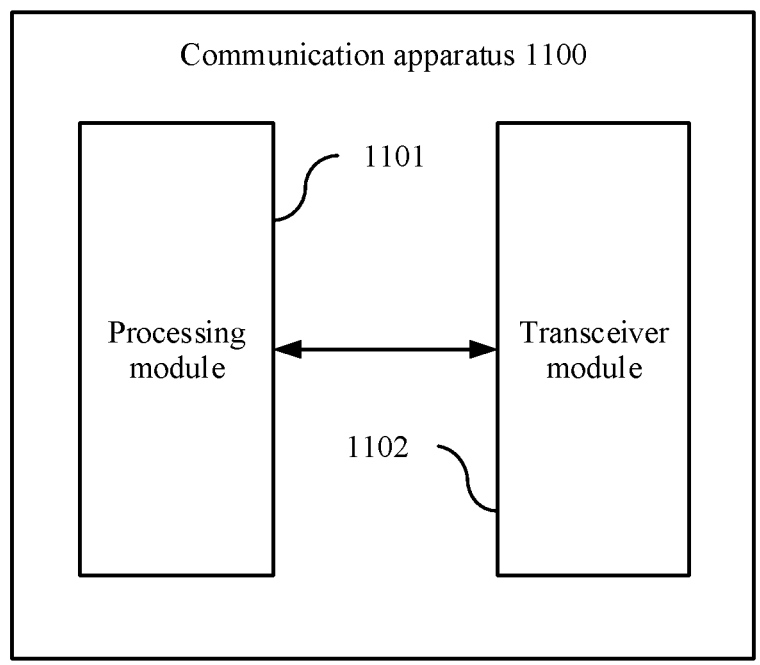
FIG. 11 is a schematic diagram 3 of a structure of a communication apparatus according to an embodiment of this application.

For example, FIG. 11 is a schematic diagram 3 of a structure of a communication apparatus according to an embodiment of this application. As shown in FIG. 11, a communication apparatus 1100 includes a processing module 1101 and a transceiver module 1102. For ease of description, FIG. 11 shows only main components of the communication apparatus 1100.

Optionally, in an implementation scenario, the communication apparatus 1100 is applicable to the communication system shown in FIG. 1, and performs a function of the first network element in the communication method shown in FIG. 8.

The transceiver module 1102 is configured to receive data of an MBS.

The processing module 1101 is configured to control the transceiver module 1102 to send the data of the MBS to a terminal device by using a unicast QoS flow of a PDU session of the terminal device. The terminal device may join an MBS session through the PDU session.

In a possible design, the communication apparatus 1100 may be an access network element. The data of the MBS is carried in a first data packet. The first data packet includes an identifier of a multicast QoS flow. Correspondingly, the processing module 1101 is further configured to determine the unicast QoS flow based on a mapping relationship. The mapping relationship includes a correspondence between the identifier of the multicast QoS flow and an identifier of the unicast QoS flow.

Optionally, the processing module 1101 is further configured to determine, based on an air interface status of the terminal device, to send the data of the MBS in a unicast manner.

Further, the processing module 1101 is further configured to determine to send the data of the MBS in the unicast manner based on one or more of the following. A signal strength of a signal received by the terminal device from the access network element is less than or equal to a strength threshold, and a quantity of terminal devices that receive the MBS through the access network element is less than or equal to a quantity threshold.

In another possible design, the communication apparatus 1100 may be a user plane network element. The data of the MBS is carried in a first data packet. The first data packet includes an identifier of a multicast QoS flow. Correspondingly, the processing module 1101 is further configured to determine the unicast QoS flow based on a mapping relationship. The mapping relationship includes a correspondence between the identifier of the multicast QoS flow and an identifier of the unicast QoS flow.

Optionally, the transceiver module 1102 is further configured to receive the mapping relationship from a session management network element.

Optionally, the mapping relationship may further include a correspondence between a multicast QoS parameter and a unicast QoS parameter. The multicast QoS parameter is a QoS parameter of the multicast QoS flow, and the unicast QoS parameter is a QoS parameter of the unicast QoS flow.

Optionally, the communication apparatus 1100 may further include a storage module (not shown in FIG. 11). The storage module stores a program or instructions. When the processing module 1101 executes the program or the instructions, the communication apparatus 1100 is enabled to perform the communication method shown in FIG. 8.

It should be noted that the communication apparatus 1100 may be an access network element or a user plane network element that supports the MBS, or may be a chip or a chip system disposed in the access network element or the user plane network element. This is not limited in this application.

In addition, for a technical effect of the communication apparatus 1100, refer to the technical effect of the communication method shown in FIG. 8. Details are not described herein again.

Optionally, in another implementation scenario, the communication apparatus 1100 is applicable to the communication system shown in FIG. 1, and performs a function of the session management network element in the communication method shown in FIG. 8.

The processing module 1101 is configured to generate a mapping relationship. The mapping relationship is used by a first network element to send data of an MBS to a terminal device by using a unicast QoS flow of a PDU session of the terminal device. The terminal device may join an MBS session through the PDU session. The transceiver module 1102 is configured to send the mapping relationship to the first network element.

In a possible design, the mapping relationship includes a correspondence between an identifier of a multicast QoS flow and an identifier of the unicast QoS flow.

Optionally, the mapping relationship may further include a correspondence between a multicast QoS parameter and a unicast QoS parameter. The multicast QoS parameter is a QoS parameter of the multicast QoS flow, and the unicast QoS parameter is a QoS parameter of the unicast QoS flow.

For example, the first network element may be an access network element or a user plane network element, that is, the access network element or the user plane network element may complete a forwarding operation on the data of the MBS.

Optionally, the communication apparatus 1100 may further include a storage module (not shown in FIG. 11). The storage module stores a program or instructions. When the processing module 1101 executes the program or the instructions, the communication apparatus 1100 is enabled to perform the communication method shown in FIG. 8.

It should be noted that the communication apparatus 1100 may be a session management network element, or may be a chip or a chip system disposed in the session management network element. This is not limited in this application.

In addition, for a technical effect of the communication apparatus 1100, refer to the technical effect of the communication method shown in FIG. 8. Details are not described herein again.

An embodiment of this application provides a chip system. The chip system includes a processor and an input/output port. The processor is configured to implement a processing function related to any apparatus (for example, the first network element or the session management network element) in the foregoing method embodiments. The input/output port is configured to implement a transceiver function related to the apparatus in the foregoing method embodiments.

In a possible design, the chip system further includes a memory. The memory is configured to store corresponding computer instructions and data that implement a function of the apparatus in the foregoing method embodiments.

The chip system may include a chip, or may include a chip and another discrete device.

An embodiment of this application provides a communication system. The communication system includes one or more access network elements, for example, the access network element in the embodiment shown in FIG. 8, or the source access network element and the target access network element in the embodiment shown in FIG. 9, and one or more core network elements, for example, the user plane network element and the session management network element in the embodiment shown in FIG. 8 or FIG. 9. Further, the communication system may further include the terminal device in the embodiment shown in FIG. 8 or FIG. 9.

An embodiment of this application provides a computer-readable storage medium. The computer-readable storage medium includes a program or instructions. When the program or the instructions are run on a computer, the computer is enabled to perform the communication method related to any apparatus in the foregoing method embodiments.

An embodiment of this application provides a computer program product including instructions. The computer program product includes a program or the instructions. When the program or the instructions are run on a computer, the computer is enabled to perform the communication method related to any apparatus in the foregoing method embodiments.

It should be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

It may be further understood that the memory in embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. By way of example and not limitation, many forms of random access memory (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware (for example, a circuit), firmware, or any combination thereof. When the software is used for implementation, all or some of the foregoing embodiments may be implemented in a form of a computer program product. The computer program product includes one or more computer instructions or computer programs. When the program instructions or the computer programs are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and indicates that three relationships may exist. For example, A and/or B may indicate the following three cases: only A exists, both A and B exist, and only B exists. A and B may be singular or plural. In addition, the character "/" in this specification usually represents an "or" relationship between the associated objects, or may indicate an "and/or" relationship. A specific meaning depends on a context.

In this application, "at least one" refers to one or more, and "a plurality of" refers to two or more. "At least one of the following items (pieces)" or a similar expression thereof means any combination of these items, including any combination of singular items (pieces) or plural items (pieces). For example, at least one (piece) of a, b, or c may indicate a, b, c, a and b, a and c, b and c, or a, b, and c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments, and details are not described herein again.

In several embodiments provided in this application, it should be understood that the disclosed system, apparatus, and method may be implemented in other manners. For example, the described apparatus embodiments are merely examples. For example, the division into units is merely logical function division and may be other division during actual implementation. For example, a plurality of units or components may be combined or integrated into another system, or some features may be ignored or not performed.

In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, for example, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in the computer-readable storage medium. Based on this understanding, the technical solutions of this application essentially, or the part contributing to the conventional technology, or some of the technical solutions may be implemented in a form of a software product. The computer software product is stored in a storage medium, and includes several instructions for instructing a computer device (which may be, for example, a personal computer, a server, or a network device) to perform all or some of the steps of the methods described in embodiments of this application. The storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method implemented by a source access network element, comprising:
   sending a handover request to a target access network element to hand over a terminal device to the target access network element, wherein the handover request comprises information of a unicast quality of service (QOS) flow of a protocol data unit (PDU) session, and wherein the unicast QoS flow corresponds to a multicast QoS flow of a multicast broadcast service (MBS);
   receiving a handover response from the target access network element in response to the handover request, wherein the handover response comprises configuration information of a radio resource corresponding to the unicast QoS flow; and
   sending, when the target access network element does not support the MBS and after the terminal device is handed over to the target access network element, the configuration information to the terminal device, wherein the configuration information is used for the terminal device to access the target access network element on the radio resource.

2. The method of claim 1, further comprising further sending the configuration information in a handover command.

3. The method of claim 1, further comprising:
receiving a first data packet from a user plane network element, wherein the first data packet comprises a first identifier of the multicast QoS flow and data of the MBS; and
sending a second data packet to the target access network element, wherein the second data packet comprises a second identifier of the unicast QoS flow and the data of the MBS.

4. The method of claim 1, further comprising:
obtaining, based on a mapping relationship, information of the unicast QoS flow corresponding to the multicast QOS flow, wherein the mapping relationship comprises a correspondence between a first identifier of the multicast QoS flow and a second identifier of the unicast QoS flow.

5. The method of claim 4, further comprising receiving the mapping relationship.

6. The method of claim 4, further comprising:
receiving a data packet of the MBS; and
converting, based on the mapping relationship, the data packet into a unicast data packet.

7. The method of claim 1, further comprising switching the multicast QoS flow to the unicast QoS flow when the target access network element does not support the MBS.

8. A communication apparatus comprising:
a memory configured to store computer instructions; and
one or more processors coupled to the memory, wherein when executed by the one or more processors, the computer instructions cause the communication apparatus to be configured to:
send a handover request to a target access network element to hand over a terminal device to the target access network element, wherein the handover request comprises information of a unicast quality of service (QOS) flow of a protocol data unit (PDU) session, and the unicast QoS flow corresponds to a multicast QoS flow of a multicast broadcast service (MBS);
receive a handover response from the target access network element, wherein the handover response comprises configuration information of a radio resource corresponding to the unicast QoS flow; and
send, when the target access network element does not support the MBS and after the terminal device is handed over to the target access network element, the configuration information to the terminal device, wherein the configuration information is used for the terminal device to access the target access network element on the radio resource.

9. The communication apparatus of claim 8, wherein the configuration information of the radio resource is sent in a handover command.

10. The communication apparatus of claim 8, wherein when executed by the one or more processors, the computer instructions further cause the communication apparatus to be configured to:
receive a first data packet from a user plane network element, wherein the first data packet comprises a first identifier of the multicast QoS flow and data of the MBS; and
send a second data packet to the target access network element, wherein the second data packet comprises a second identifier of the unicast QoS flow and the data of the MBS.

11. The communication apparatus of claim 8, wherein when executed by the one or more processors, the computer instructions further cause the communication apparatus to be configured to obtain, based on a mapping relationship, information of the unicast QOS flow corresponding to the multicast QoS flow, wherein the mapping relationship comprises a correspondence between a first identifier of the multicast QoS flow and a second identifier of the unicast QoS flow.

12. The communication apparatus of claim 11, wherein when executed by the one or more processors, the computer instructions further cause the communication apparatus to be configured to receive the mapping relationship.

13. The communication apparatus of claim 11, wherein when executed by the one or more processors, the computer instructions further cause the communication apparatus to be configured to:
receive a data packet of the MBS; and
convert, based on the mapping relationship, the data packet into a unicast data packet.

14. The communication apparatus of claim 8, wherein when executed by the one or more processors, the computer instructions further cause the communication apparatus to be configured to switch the multicast QoS flow to the unicast QoS flow when the target access network element does not support the MBS.

15. A communication system comprising:
a source access network element configured to:
send a handover request, wherein the handover request comprises information of a unicast quality of service (QOS) flow of a protocol data unit (PDU) session, wherein the unicast QoS flow corresponds to a multicast QOS flow of a multicast broadcast service (MBS);
receive a handover response, wherein the handover response comprises configuration information of a radio resource corresponding to the unicast QoS flow; and
send the configuration information to a terminal device; and
a target access network element, wherein the configuration information is used for the terminal device to access the target access network element on the radio resource, and wherein the target access network element is configured to:
receive, from the source access network element, the handover request; and
send the handover response to the source access network element, wherein, when the target access network element does not support the MBS and after the terminal device is handed over to the target access network element, the source access network element sends the configuration information to the terminal device.

16. The communication system of claim 15, wherein the source access network element is further configured to:
receive a first data packet from a user plane network element, wherein the first data packet comprises a first identifier of the multicast QoS flow and data of the MBS; and
send a second data packet to the target access network element, wherein the second data packet comprises a second identifier of the unicast QoS flow and the data of the MBS.

17. The communication system of claim 15, further comprising:
a session management network element configured to send a request message to a user plane network element, wherein the request message is configured to request the user plane network element to send data of the MBS to the target access network element by using the unicast QOS flow; and a user plane network element configured to:
  receive the request message; and
  send the data of the MBS to the target access network element by using the unicast QOS flow.

18. The communication system of claim 15, wherein the source access network element is further configured to obtain, based on a mapping relationship, information of the unicast QoS flow corresponding to the multicast QoS flow, wherein the mapping relationship comprises a correspondence between a first identifier of the multicast QoS flow and a second identifier of the unicast QoS flow.

19. The communication system of claim 18, wherein the source access network element is further configured to receive the mapping relationship.

20. The communication system of claim 18, wherein the source access network element is further configured to:
  receive a data packet of the MBS; and
  convert, based on the mapping relationship, the data packet into a unicast data packet.

* * * * *